US011989856B2

(12) United States Patent
Hakim et al.

(10) Patent No.: US 11,989,856 B2
(45) Date of Patent: May 21, 2024

(54) SYSTEMS AND METHODS FOR REDUCING IMAGE ARTEFACTS IN BINOCULAR DISPLAYS

(71) Applicant: ELBIT SYSTEMS LTD., Haifa (IL)

(72) Inventors: Dan Hakim, Haifa (IL); Eli Rorberg, Haifa (IL); Yotam Gil, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 17/418,831

(22) PCT Filed: Dec. 28, 2019

(86) PCT No.: PCT/IL2019/051421
§ 371 (c)(1),
(2) Date: Jun. 27, 2021

(87) PCT Pub. No.: WO2020/141507
PCT Pub. Date: Jul. 9, 2020

(65) Prior Publication Data

US 2022/0092754 A1 Mar. 24, 2022

(30) Foreign Application Priority Data

Dec. 30, 2018 (IL) ........................................ 264032

(51) Int. Cl.

| | |
|---|---|
| ***G06T 5/50*** | (2006.01) |
| ***G02B 27/01*** | (2006.01) |
| ***H04N 13/156*** | (2018.01) |

(52) U.S. Cl.
CPC ............ *G06T 5/50* (2013.01); *G02B 27/0172* (2013.01); *H04N 13/156* (2018.05);
(Continued)

(58) Field of Classification Search
CPC . G06T 5/50; G06T 2207/20212; G06T 5/006; G06T 7/10; G06T 7/174;
(Continued)

(56) References Cited

U.S. PATENT DOCUMENTS

| | | | |
|---|---|---|---|
| 5,233,458 | A | 8/1993 | Moffitt et al. |
| 5,488,508 | A | 1/1996 | Haseltine |

(Continued)

FOREIGN PATENT DOCUMENTS

| | | | |
|---|---|---|---|
| EP | 2297694 | | 3/2011 |
| EP | 2297694 | B1 | 10/2014 |

(Continued)

OTHER PUBLICATIONS

International Search Report of PCT/IL2019/051421 Completed Apr. 1, 2020; Mailed Apr. 2, 2021 4 pages.

(Continued)

*Primary Examiner* — Mekonen T Bekele
(74) *Attorney, Agent, or Firm* — The Roy Gross Law Firm, LLC; Roy Gross

(57) ABSTRACT

Aspects of embodiments pertain to a method for reducing a subjective visual artefact when displaying binocular overlapping images to a user of a binocular display system, the method comprising generating, by an image display unit comprising a plurality of pixels elements, right and left-eye source images; projecting the right and left-eye source images via corresponding left and right viewing optics to its user such that the user perceives partially overlapping left and right-hand observation images; reducing, a perception of a subjective visual artefact in the perceived right and/or left-hand observation images by modifying one or more pixel and/or image parameters values relating to the left and/or right-hand source images.

22 Claims, 10 Drawing Sheets

10100 GENERATING, BY AN IMAGE DISPLAY UNIT HAVING A PLURALITY OF PIXELS, LEFT AND RIGHT EYE SOURCE IMAGES

10200 PROJECTING THE RIGHT AND LEFT-EYE SOURCE IMAGES VIA CORRESPONDING LEFT AND RIGHT VIEWING OPTICS TO ITS USER SUCH THAT THE USER PERCEIVES PARTIALLY OVERLAPPING LEFT AND RIGHT-HAND OBSERVATION IMAGES

10300 REDUCING, BASED ON PERFORMANCE CHARACTERISTICS OF THE BINOCULAR DISPLAY SYSTEM, A PERCEPTION OF A SUBJECTIVE ARTEFACT IN THE PERCEIVED LEFT- AND RIGHT-HAND OBSERVATION IMAGES BY SETTING ONE OR MORE PIXEL CHARACTERISTICS OF THE LEFT- AND/OR RIGHT-HAND SOURCE IMAGES

(52) U.S. Cl.
CPC ................ *G02B 2027/0123* (2013.01); *G02B 2027/0132* (2013.01); *G02B 2027/0178* (2013.01); *G06T 2207/20212* (2013.01)

(58) Field of Classification Search
CPC ........ G02B 27/0172; G02B 2027/0123; G02B 2027/0132; G02B 2027/0178; G02B 27/0093; G02B 2027/011; H04N 13/156; H04N 13/344; H04N 13/383; H04N 13/122; H04N 9/3179; H04N 13/10
See application file for complete search history.

(56) References Cited

U.S. PATENT DOCUMENTS

| | | | | |
|---|---|---|---|---|
| 5,581,271 | A | 12/1996 | Kraemer | |
| 8,526,716 | B2 | 9/2013 | Knee | |
| 8,611,498 | B2 | 12/2013 | Machida | |
| 8,872,902 | B2 | 10/2014 | Hyodo et al. | |
| 9,223,404 | B1* | 12/2015 | Ivanchenko | G06F 3/0304 |
| 9,366,883 | B2 | 6/2016 | Moore | |
| 9,460,501 | B1 | 10/2016 | Jiang et al. | |
| 9,560,960 | B2 | 2/2017 | Hofeldt | |
| 2003/0063201 | A1* | 4/2003 | Hunter | H04N 25/134 348/241 |
| 2005/0281411 | A1 | 12/2005 | Vesely et al. | |
| 2009/0027558 | A1* | 1/2009 | Mantiuk | H04N 9/67 348/E5.073 |
| 2011/0234921 | A1 | 9/2011 | Ivashin | |
| 2012/0050272 | A1 | 3/2012 | Iwata et al. | |
| 2012/0127163 | A1 | 5/2012 | Kim et al. | |
| 2014/0104142 | A1* | 4/2014 | Bickerstaff | G02B 27/017 345/8 |
| 2015/0117717 | A1* | 4/2015 | Cho | G06V 40/103 382/106 |
| 2016/0269717 | A1 | 9/2016 | Kato | |
| 2016/0350941 | A1 | 12/2016 | Yu et al. | |
| 2017/0038590 | A1 | 2/2017 | Jepsen | |
| 2017/0064203 | A1 | 3/2017 | Kikuta | |
| 2017/0223333 | A1* | 8/2017 | Zou | H04N 13/128 |
| 2017/0374351 | A1* | 12/2017 | Doerre | B64C 39/024 |
| 2018/0268531 | A1* | 9/2018 | Takahashi | G06T 7/593 |
| 2018/0275398 | A1* | 9/2018 | Kikuchi | G02B 25/00 |
| 2018/0359463 | A1* | 12/2018 | Mori | G02B 30/34 |

FOREIGN PATENT DOCUMENTS

| | | | |
|---|---|---|---|
| JP | 2006129016 | A | 5/2006 |
| JP | 2013102384 | A | 5/2013 |
| JP | 2017215688 | A | 12/2017 |
| WO | 2009123067 | A1 | 10/2009 |
| WO | 2012029251 | A1 | 3/2012 |
| WO | 2012137520 | A1 | 10/2012 |
| WO | 2014057274 | A1 | 4/2014 |
| WO | 2016009434 | A1 | 1/2016 |
| WO | 2017078860 | A1 | 5/2017 |

OTHER PUBLICATIONS

Written Opinion of PCT/IL2019/051421 Completed Apr. 1, 2020; Mailed Apr. 2, 2021 5 pages.

Anonymous: “Just-Noticeable Difference—Wikipedia”, Jul. 2018, https://web.archive.org/web/20180716200651/https://en.wikipedia.org/wiki/Just-noticeable_difference.

European Patent Application No. 19907813.0, Extended European Search Report dated Jan. 26, 2022.

“1st IL Office Action dated Jun. 26, 2019 regarding IL application 264032”.

Chapter 9: The Human Eye presentation retrieved from https://web.stanford.edu/class/cs379c/archive/2010/stanford.lecture.04.pdf, published in 2010, 88 pages.

“Helmet Mounted Displays: Sensation, Perception and Cognition Issues” downloaded from https://apps.dtic.mil/dtic/tr/fulltext/u2/a522022.pdf, published in 2009, 971 pages.

International Search Report and Written Opinion for Application No. PCT/IL2019/051421, mailed on Apr. 2, 2020, 9 pages.

James E. Melzer, “Head-Mounted Displays,” Chapter 5, retrieved from http://www.davi.ws/avionics/TheAvionicsHandbook_Cap_5.pdf, 2001, 21 pages.

Victor Klymenko., et al., “Convergent and divergent viewing affect luning, Visual thresholds and field-of-view fragmentation in partial binocular overlap helmet mounted displays”, Corporate Author: UES, Inc., U. S. Army Aeromedical Research Laboratory, Fort Rucker, AL 36362; 82/ SPIE vol. 2218, Jun. 10, 1994.

Victor Klymenko, et al., “Factor affecting the perception of luning in partial binocular overlap displays”, (Appendix B, First Draft Copy) Oct. 21, 1996.

Victor Klymenko, et al., “Factors affecting the perception of luning in monocular regions of partial binocular overlap displays”, Corporate Author: UES, Inc., U. S. Army Aeromedical Research Laboratory, Fort Rucker, AL 36362-0577, Aug. 1994.

* cited by examiner

"Right" FOV
"Left" FOV
Q
HMD FOV 1166
1166R
1166RL
1166L
1182R
1182L
1180R
1180L
610R
610L
600

Human FOV 604
604R
604RL
604L
506R
506L
1168R
1168L
FIG. 4A(1)
FIG. 4A(2)

SYSTEMS AND METHODS FOR REDUCING IMAGE ARTEFACTS IN BINOCULAR DISPLAYS

This application is a National Phase of PCT Patent Application No. PCT/IL2019/051421 having International filing date of Dec. 28, 2019, which claims the benefit of priority of Israeli Patent Application No. 264032, filed Dec. 30, 2018, the contents of which are all incorporated herein by reference in their entirety.

TECHNICAL FIELD

The present disclosure relates in general to display devices, systems and methods, and in particular, to binocular display devices, systems and methods.

BACKGROUND

Head-Mountable Displays or HMD systems are, inter alia, employed for conveying information to a user or viewer controlling a vehicle and/or for monitoring parameters relating to the vehicle's operation.

Either type of the above noted HMD systems may employ binocular viewing optics for projecting respective images towards each of the viewer's eyes. Some types of HMD systems are operable to display a computer-generated symbol while at same time allowing the viewer to see through the HMD system's visor.

Other types of HMD systems are operable to obscure the real-world environment and allow the viewer only to see the displayed image, for example, for displaying the viewer a virtual space surrounding him. Additional HMD system applications can include displaying the viewer a "mixed reality" by modifying the viewer's perceptions of the world using a blend of real and virtual (i.e., computer-generated) objects.

The description above is presented as a general overview of related art in this field and should not be construed as an admission that any of the information it contains constitutes prior art against the present patent application.

BRIEF DESCRIPTION OF THE FIGURES

The Figures illustrate generally, by way of example, but not by way of limitation, various embodiments discussed in the present document.

For simplicity and clarity of illustration, elements shown in the Figures have not necessarily been drawn to scale. For example, the dimensions of some of the elements may be exaggerated relative to other elements for clarity of presentation. Furthermore, reference numerals may be repeated among the Figures to indicate corresponding or analogous elements. References to previously presented elements are implied without necessarily further citing the drawing or description in which they appear. The Figures are listed below.

FIG. 4A schematically depicts a luning artefact; according to some embodiments;

DETAILED DESCRIPTION

Figure 1:
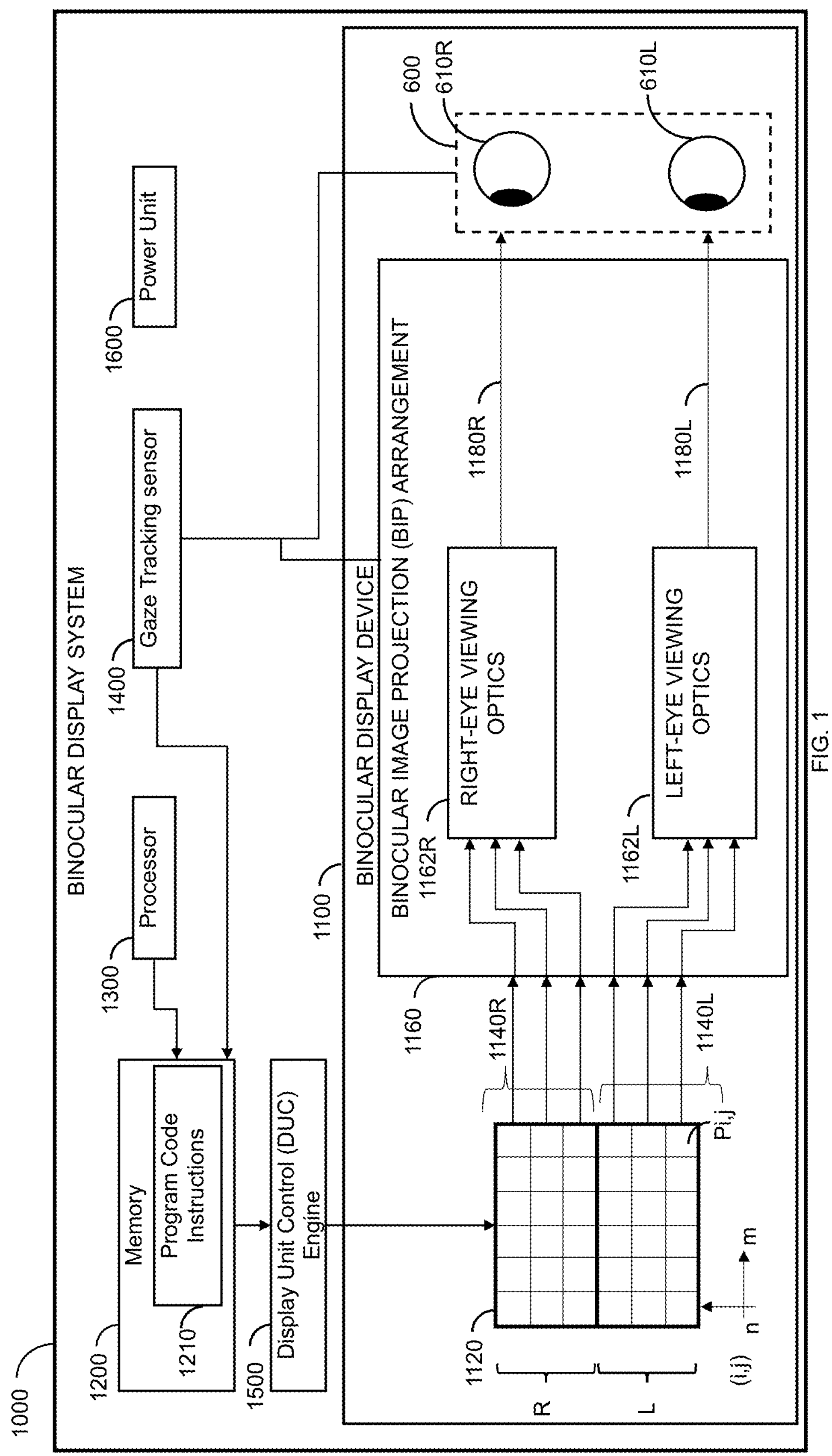
FIG. 1 is a schematic block diagram illustration of a binocular display system, according to some embodiments.

Aspects of disclosed embodiments concern binocular display devices, systems and methods. The term "binocular display system" pertains to a system that employs binocular viewing optics for projecting respective images towards a user (also: viewer). Binocular display system can include, for example, binocular head-mountable display (HMD) systems.

A human Field-of-View is approximately 200 degrees. The FOV portion that is only seen by one eye may be referred to as a monocular viewing region, and the FOV portion that is seen by both eyes together may herein referred to as the binocular viewing region. The border between the binocular viewing region and the monocular viewing region of an eye may herein be referred to as "binocular overlap border", and the region comprising the binocular overlap border may herein be referred to as "overlap border region". The latter mode of display or projection of a scene to the eyes may herein be referred to as "partial binocular overlap display mode".

Luning may occur in the overlap border region. A left overlap border region and a right overlap border region may herein be referred to as "left luning region" and "right luning region", respectively.

It may be desirable to attempt to mimic the human FOV as well as the human binocular overlap in a binocular display system to allow providing the viewer with disparity cues to achieve stereopsis. However, to provide a binocular display system that provides a human FOV and correspondingly human binocular overlap, comparatively large optics may be required, which may not be feasible due to certain binocular (e.g., HMD) system design constraints such as, for example, weight and size of binocular HMD systems. Accordingly, some binocular display systems may provide a Field-of-View that is smaller than the human FOV and binocular overlap, possibly introducing subjective visual artefacts perceivable by the viewer.

In embodiments, a binocular display device of a binocular display system comprises an image display unit having a plurality of pixels for displaying right and left-eye source images. The binocular display device further includes right and left-eye viewing optics which are optically coupled with the image display unit for projecting the displayed right and left-eye source images to a viewer. The left- and right-eye source images are generated and projected so that the viewer perceives partially overlapping left and right-hand observation images.

Optionally, left- and right eye source images may be generated by corresponding left- and right eye pixels, which are different from one another. In the latter case, some of the left-eye pixels may display the same image information as the right-eye pixels. Such same image (or scene) information generated by the left and right-eye pixels is conveyed by the respective left and right-eye viewing optics for display to the viewer in a binocular viewing region of the FOV. Complementary image information that is generated either by the left- or the right-eye pixels are conveyed to the viewer for display in the non-overlap or monocular viewing region of the FOV.

Optionally, at least some of the image information pertaining to the binocular viewing region may be generated by same pixels of the image display unit. In that case, the left- and right-eye viewing optics may share some of the pixels for conveying image information pertaining to the binocular viewing region displayed to the viewer. In other words, both the left- and right-viewing optics may convey image information generated by the same pixels for projection to the viewer.

In an embodiment, the binocular display system comprises a display unit control engine that is operable to reduce, based on system performance characteristics of the binocular display system, the viewer's perception of a subjective visual artefact in the perceived right and left-hand observation images by modifying artefact correction parameter values (e.g., one or more pixel parameter values) of the left and/or right-hand source images.

In some embodiments, the binocular display system characteristics may pertain, for example, to a pixel position, pixel intensity, perceived pixel brightness, pixel color, pixel refresh rate; and/or the number of pixels allocated for projection to the left-eye monocular region, the right-eye monocular region and the binocular viewing region. Hence, in some examples, modification of pixel parameter values may pertain to pixel position, pixel output intensity, pixel color and/or perceived brightness. Image display parameter values may pertain, for example, to display refresh rate, size and/or boundaries of various display region of the display unit. In some embodiments, display refresh rates may be dynamically or adaptively controlled to reduce or eliminate perceived image artefact. In some embodiments, different display regions of the display unit may be controlled to obtain different refresh rates to reduce or eliminate perceived image artefact. In some embodiments, display region boundaries for applying different refresh rates may be controlled dynamically or adaptively to reduce or eliminate perceived image artefact. Adaptive control may be performed manually, automatically or semi-automatically.

Additional operational characteristics can include, for example, the system's computational power (e.g., processor, memory), tracking sensors, power unit, etc., and/or to the user's human vision system. While characteristics of the user's vision system can be considered to have an influence on the performance characteristics of the binocular display system, the viewer's vision system shall not be construed to be part of the binocular display system.

The expression "pixel parameter", as used herein, may refer any one of the following: pixel output intensity, pixel color, pixel refresh rate, number of pixels allocated for projection to the left-eye monocular viewing region, the right-eye monocular viewing region and/or the binocular viewing region, and/or the like. It is noted that a pixel may comprise two or more subpixels, e.g., for generating a desired color to correct for a perceived image artefact. In some embodiments, a pixel includes one pixel only. The expression "image display parameter values" may refer, for example, to display refresh rate, display region boundaries for selectively controlling the refresh rates of different display regions, and/or spatial filtering applied on the image information generated by the pixels.

For example, to reduce or eliminate luning artefacts, a parameter value of a pixel associated with (e.g., mapped to) a monocular viewing region may be altered (e.g., pixel output intensity may be increased) such to increase perceived pixel brightness; or a parameter value of a pixel associated with (e.g., mapped to) a binocular viewing region may be altered (e.g., pixel output intensity may be decreased) such to reduce perceived pixel brightness; or the parameter value of a pixel associated with (e.g., mapped to) a monocular viewing region may be altered (e.g., pixel output intensity may be increased) to increase perceived pixel brightness and, at the same time, the parameter value of a pixel associated with (e.g., mapped to) a binocular viewing region may be altered (e.g., pixel output intensity may be decreased) to reduce perceived pixel brightness in order to diminish or eliminate luning artefacts.

In a further example, to reduce or eliminate luning artefacts, a parameter value of an image display region associated with (e.g., mapped to) a monocular viewing region may be altered (e.g., image display refresh rate increased) such to increase perceived pixel brightness; or an image display parameter value associated with (e.g., mapped to) a binocular viewing region may be altered (e.g., image display intensity may be decreased) such to reduce perceived pixel brightness; or the parameter value of a display region associated with (e.g., mapped) to a monocular viewing region may be altered (e.g., image display rate may be increased) to increase perceived pixel brightness and, at the same time, a parameter value of a display region associated with (e.g., mapped to) a binocular viewing region may be altered (e.g., pixel output intensity may be decreased) to reduce perceived pixel brightness in order to diminish or eliminate luning artefacts.

In some embodiments, pixel characteristics of a left and/or right monocular region may be altered to change the user's perception of image information of the binocular region; and/or pixel characteristics of the binocular region may be altered to change the user's perception of image information of the left and/or right monocular region.

In some embodiments, the pixel and/or image display parameter values may be altered to prevent or reduce unwanted drop in perceived brightness in the monocular and/or the binocular viewing regions.

In some embodiments, modification of a pixel and/or image display parameter value applied to reduce or eliminate left-luning artefact may differ from pixel and/or image display parameter value modification applied to reduce right-luning artefact.

Prior to modifying the one or more pixel and/or image display parameter values, the binocular display system's performance characteristics may be determined. This may comprise localizing, in the viewer's Field-of-View (FOV), regions of occurrence of the perceptual artefact, e.g., by determining the border area location between overlapping and non-overlapping regions of the left and right-hand observed images.

Various methods can be employed for determining the area and position of a user's binocular and monocular viewing regions and/or corresponding luning region(s). For example, one method includes determining the position and extent of the binocular and monocular viewing regions based on the optical design parameter values of the binocular display system, e.g., by employing an optical design software. In a yet further example, a calibrated camera may be positioned to cover the exit pupils of the mono- and binocular viewing regions, or two calibrated cameras, one for each exit pupil, may be positioned to capture image-bearing light propagating through the exit pupils of the binocular display system. Based on image information generated by the binocular display system and captured by the camera(s), the relative position and extent of the monocular/binocular viewing regions the position and extent of the luning and/or of the overlap region(s) may be determined. Optionally, the boundaries of the various viewing regions (e.g., monocular, binocular, overlap and luning regions) may be associated with simulated and/or corresponding user-specific interpupil distance (IPD) measurements. IPDs may be simulated, for example, by changing the distance between two cameras, each camera being positioned to capture image information projected via the left and right exit pupil of the binocular display system. The simulated IPD measurements may be associated with artefact correction parameter values (e.g., in a look-up-table).

The binocular display system may determine whether a user-specific IPD, optionally measured in-use by an eye-tracker, corresponds to a simulated IPD. If the binocular display system determines that the user-specific IPD corresponds to a simulated IPD, the artefact correction parameter values associated with the simulated IPD may be applied by the binocular display system to take into account the user-specific IPD when correcting for subjective visual artefacts.

In some embodiments, an eye model may be used in conjunction with an eye tracker to estimate the position of the perceived luning artefacts for adaptively applying artefact correction in accordance with the user's eye gaze direction and the associated eye model. Optionally, the eye model may be user-specific. Optionally, the eye model may pertain to a selected population of users (e.g., pilots). The eye model may include, for example, location of the macula and/or fovea, which is used by the binocular display system for applying the luning artefact correction. In some embodiments, the eye model may also include the user's IPD or the IPD of selected population.

In some embodiments, the eye model may be used in conjunction with the eye tracker to estimate a location of incidence of light rays onto the retina and luning artefact correction may be applied in accordance with the location of incidence onto the retina.

Optionally, the boundaries of the various viewing regions may be determined based on a user-provided input. For example, characteristics of the luning region may be altered responsive to receiving a user-provided input altering the pixel parameter values characteristics, e.g., by changing decay rate of a correction function, by shifting a position parameter value of the correction function and/or by modifying other artefact correction parameter values.

Optionally, the user of the binocular display system may be asked to gaze at various regions of the FOV and provide, for different gaze directions, an input indicative of viewing region boundaries such as, for example, the position of the luning region. The user's gaze direction, which may be tracked with an eye-tracker of the binocular display system, may be associated with user-provided inputs indicative of viewing region characteristics. This way, the luning region, for example, may be associated with the user's eye-gaze direction.

In some embodiments, the binocular display system's performance characteristics may be determined as a result of modifying pixel and/or image display parameter values, e.g., according to a feedback-based protocol.

The system performance characteristics may be determined offline, i.e., before use thereof in mission operation, and/or during mission operation, i.e., "on-the-fly", while being in use by a user. The performance characteristics may be determined automatically, semi-automatically and/or manually.

The following description of the display devices, systems and methods is given with reference to particular examples, with the understanding that such devices, systems and methods are not limited to these examples.

Referring now to FIGS. 1 and 2, a binocular display system 1000 comprises a binocular display device 1100. Binocular display device 1100 comprises a display unit 1120 that includes a plurality of pixels 1122. To simplify the discussion that following, the plurality of pixels 1122 is considered to be arranged in a matrix arrangement of m rows that are perpendicular to each one of the n columns. The row and column numbers are designated by respective indices $i=1, \ldots, m$ and $j=1, \ldots, n$. Alternative pixel arrangements may be conceived including, for example, a hexagonal pixel arrangement. Display unit 1120 is operable to generate left- and right-eye source images 1140L and 1140R that are conveyed via corresponding left and right viewing optics 1162L and 1162R of a binocular image projection (BIP) arrangement 1160 and projected as left and right-hand observation images 1180L and 1180R, respectively, towards the right and left eyes 610R and 610L of a user 600 of binocular display system 1000.

Binocular display system 1000 may further comprise a memory 1200 operable to store program code instructions 1210; a processor 1300; and a gaze tracking sensor 1400.

Binocular display system 1000 may additionally comprise or implement a display unit control (DUC) engine or logic 1500 which is operable to execute methods, processes and/or operations described herein. For instance, processor 1300 may execute program code instructions 1210 stored in memory 1200 resulting in DUC engine 1500 which is operable to implement a method for reducing a subjective visual artefact when displaying binocular overlapping images to a user of a binocular display system, which may be a head-mountable display (HMD) system. In some embodiments, the method that may be implemented by DUC engine 1500 can include, for example, generating, by display unit 1120 having a plurality of pixels elements PE, left and right-eye source images 1140L and 1140R. The method may further comprise projecting the right and left-eye source images 1140L and 1140R, via corresponding left and right viewing optics 1162L and 1162R, to a user 600 such that user 600 perceives partially overlapping left and right-hand observation images 1180L and 1180R, respectively. DUC engine 1500 may further be operable to reduce, based on performance characteristics of the binocular display system 1000, a perception of a subjective visual artefact in the perceived left and right-hand observation images 1180L and 1180R by modifying one or more pixel and/or image display parameters values of the left and right-hand source images 1140L and 1140R.

Binocular display system 1000 may further comprise a power unit 1600 for powering the various components of binocular display system 1000.

Figures 2A, 2B:
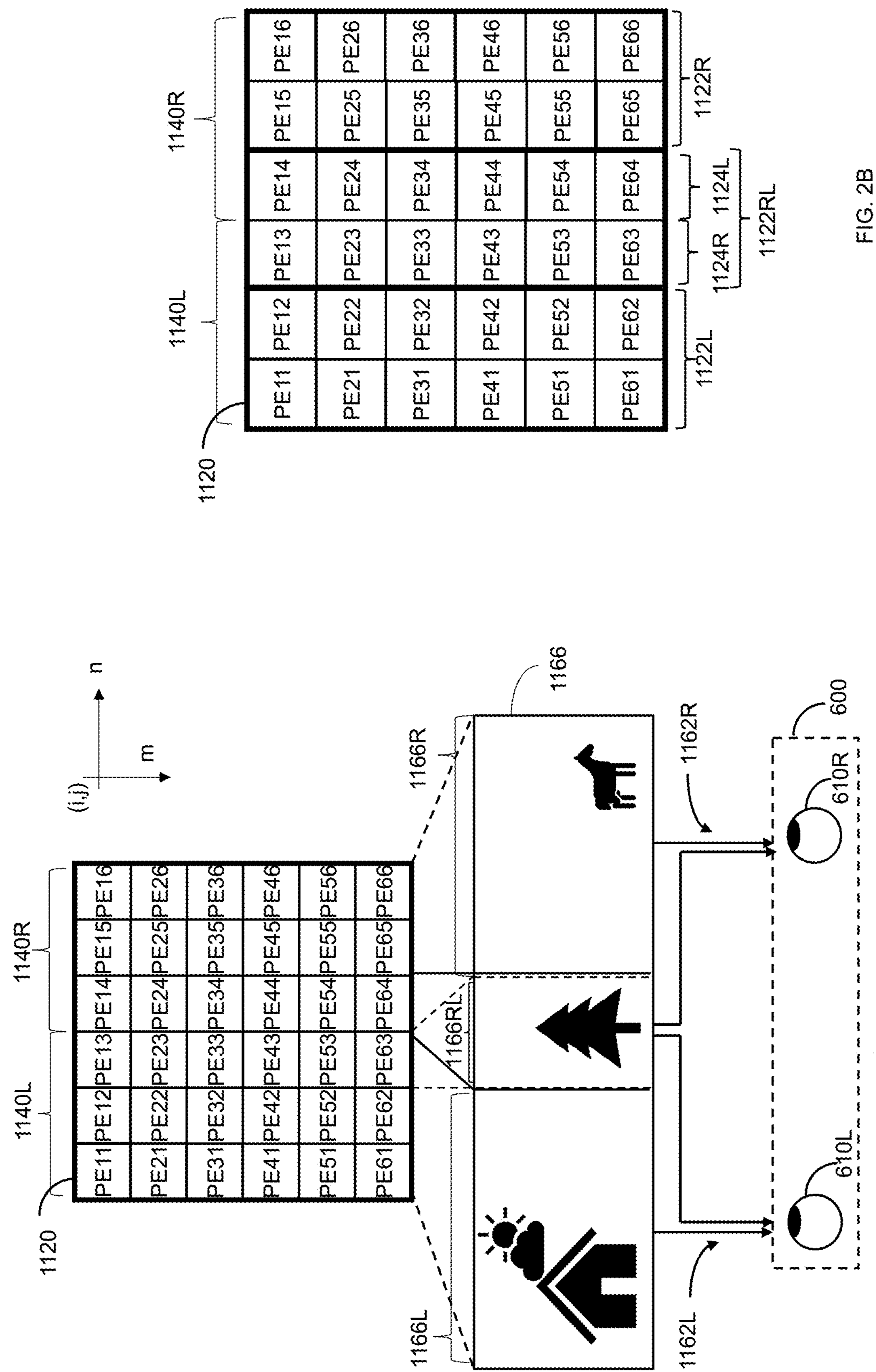
FIG. 2A illustrates a diagram of displaying observations images to a user, according to some embodiments.
FIG. 2B is a schematic illustration of a display unit, according to some embodiments.

Referring now to FIG. 2A, right- and left-eye observation images 1180R and 1180L may be projected or displayed to user 600 in a partially overlapping manner. Accordingly, the entire field-of-view (FOV) of a scene displayed to user 600 by both the right- and left-eye observation images 1180R and 1180L may have a right monocular FOV 1166R, a left monocular FOV 1166L, and an overlapping binocular FOV 1166RL. In the example shown in FIG. 2A, image-bearing light emitted by pixels (PE11-PE61) & (PE12-PE62) representing left monocular FOV 1166L is conveyed to left eye 610L only; image-bearing light emitted by pixels (PE15-PE65) & (PE16-PE66) which is associated with right monocular FOV 1166R, is conveyed to right eye 610R only; and image-bearing light emitted by pixels (PE13-PE63) & (PE14-PE64) and which is associated with overlapping binocular FOV 1166RL is conveyed to both left and right eyes 610L and 610R. Accordingly, pixels (PE13-PE63) & (PE14-PE64) convey same FOV scene information to both left and right eyes 610L and 610R. It is noted that the number of pixels shown in the accompanying FIGURES is for illustrative purposes only and should by no means be construed in a limiting manner.

Additional reference is made to FIG. 2B. To simplify the discussion that follows, the set of pixels that conveys image-bearing light to left eye 610L only is herein designated by alphanumeric reference "1122L", and the set of pixels that conveys image-bearing light only to right eye 610R only is herein designated by alphanumeric reference "1122R", and the set of pixels that conveys image-bearing light to both left and right eyes 610L and 610R is herein designated by alphanumeric reference "1122RL". Considering the above, the set of pixels 1122L displays monocular scene information of the left monocular FOV 1166L, the set of pixels 1122R displays the scene information of right monocular FOV 1166R, and the set of pixels 1122RL displays the scene information of overlapping binocular FOV 1166RL which is conveyed by corresponding left and right viewing optics 1162L and 1162R to the eyes 610L and 610R. As schematically exemplified in FIGS. 2A and 2B, a first set of pixels 1124L and 1124R, may not share or not have a pixel in common with a second set of pixels, yet both sets may convey same scene information of the same overlapping binocular FOV 1166RL to the user, for example, simultaneously.

The mode of operation schematically illustrated in the FIGS. 2A and 2B may herein be referred to as a "non-shared pixel projection mode", since image-bearing light that originates from two distinct or separate sets of pixels bearing the same image information is conveyed to left and right eyes 610L and 610R.

Figures 3A, 3B:
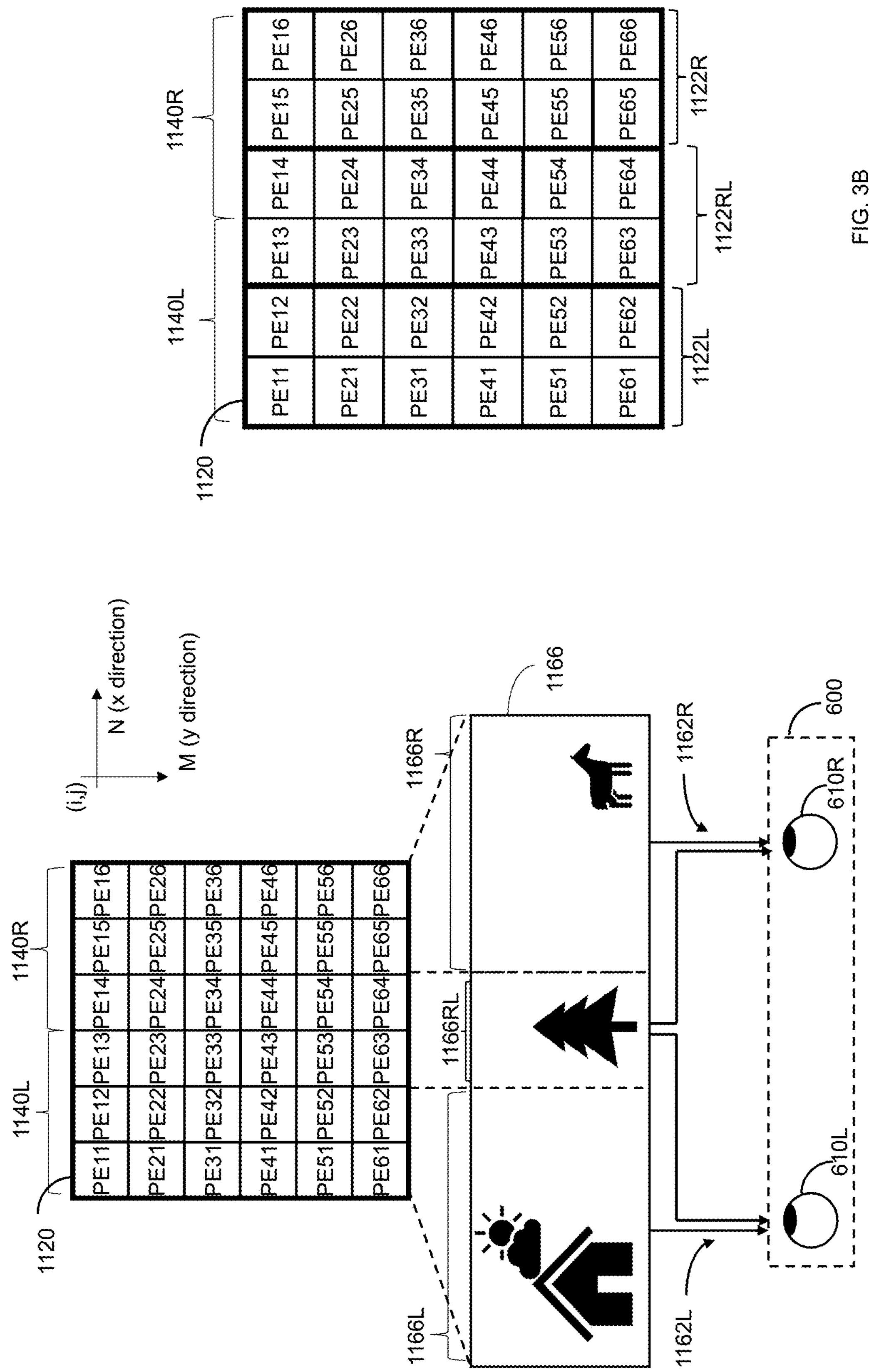
FIG. 3A illustrates another schematic diagram of displaying observations images to a user, according to some embodiments.
FIG. 3B is another schematic illustration of the display unit, according to some embodiments.

Further referring to FIGS. 3A and 3B, binocular display system 1000 is in some embodiments operable to convey to the user 600 scene information from a given set of pixels pertaining to scene information of overlapping binocular FOV 1166RL. For example, the left and right-eye viewing optics 1162L and 1162R may be operable to convey image-bearing light of the same FOV scene information and which is emitted by the given set of pixels, to both left and right eye 610L and 610R, either simultaneously or alternatingly. For example, for a certain time period t, the same FOV scene information may be simultaneously conveyed to both left and right eye 610L and 610R. In another example, the same FOV scene information may alternatingly be conveyed for a certain time period t to left eye 610L and then, for another certain time period, to right eye 610R. The mode of operation schematically illustrated in the FIGS. 3A and 3B may herein be referred to as a "shared pixel projection mode", since image-bearing light originating from the same set of pixels is conveyed to both left and right eyes 610L and 610R.

A display system may in some embodiments operate in a "hybrid pixel projection mode". Such hybrid pixel project mode may refer to a mode of operation in which distinct or different sets of pixels are allocated for generating and projecting image-bearing light to left eye 610L and right eye 610R via respectively allocated viewing optics 1162, and further in which one or more pixels are allocated for generating and projecting light to both left eye 610L and right eye 610R, simultaneously or alternatively.

Generally, operating characteristics (e.g., pixel and/or image display parameter values) of the display systems disclosed herein may be set to a static (also: predetermined) value or be controlled dynamically or adaptively. Static operating characteristics can be predetermined and remain static. Dynamically changing operating characteristics means forceful change thereof, for example, at a certain time of day, or a certain day of the year. Adaptively changing an operating characteristic means change thereof in response, for example, to changes of other operating characteristics. Adaptive changes of operating characteristics may vary depending on a variety of parameters. Optionally, the display system may provide artificial intelligence (including, e.g., machine learning) functionalities for setting the system's operating characteristics. For instance, the user's visual system (e.g., eye tracking) and/or perception (e.g., based on user-provided feedback).

In some embodiments, the display system may allow the user to select the artefact correction parameter values to be applied for reducing or eliminating a perceived image artefact such as luning, e.g., by operably engaging a control instrument (e.g., a turning knob).

In some embodiments, parameter values of an artefact correction parameter values may be selected by the user in a fully automatic or semi-automatic (e.g., partially manual and partially automatic) manner. In some embodiments, the user may manually control or select artefact correction parameter values to be applied by the binocular display system for artefact correction.

In some embodiments, pixel and/or image display parameter values relating to luning perceived in the "left" FOV may be altered differently from pixel and/or image display parameter values that relate to luning in the user's "right" FOV. The term "left FOV" may pertain to photon flux incident onto the retina of the left eye, and the term "right FOV" may pertain to photon flux incident onto the retina of the right eye.

In some embodiments, binocular display system 1000 may be operable to display source images in convergent or divergent mode, for example, as described by Klymenko et al. in "Factors affecting the perception of luning in partial binocular overlap display", Aircrew Health and Performance Division, August 1994, on pages 13-15.

In some embodiments, artefact correction parameter values may depend on one or more selected artefact correction function.

Optionally, an artefact correction function may be applied to alter pixel and/or image display parameter values that are mapped to a monocular viewing region to reduce or eliminate luning.

Optionally, an artefact correction function may be applied only to pixels and/or image display parameters of a binocular viewing region to reduce or eliminate luning. Optionally, an artefact correction function may be applied only to pixels and/or image display parameters of a monocular viewing region to reduce or eliminate luning. Optionally, an artefact correction function may be applied to alter pixel and/or image display parameter values that are mapped to a monocular viewing region, as well as to pixels and/or display regions that are mapped to a binocular viewing region to reduce or eliminate luning. It is noted that, in some embodiments, the artefact correction function may be applied to image display regions which are mapped outside the perceived luning region (also: perceived location of luning).

A first artefact correction function may be applied to correct for image artefacts perceived in a left viewing region, and a second artefact correction may be applied to correct for image artefacts perceived in a right viewing region, the first artefact correction function being different from the second artefact correction function.

Optionally, an artefact correction function may be selected from a set of available artefact correction functions. For example, one artefact correction function may be a non-linear "decay" function, and another artefact correction function may be a "linear" correction function, and the binocular display system may be operable to automatically select one artefact correction function (and corresponding parameter values) of the set of available artefact correction functions. In some embodiments, the artefact correction function and suitable parameter values may be manually selected by the user, or semi-automatically selected by the user (partially manually and partially automatically).

In some embodiments, artefact correction parameter values may be adjusted dynamically or adaptively. For example, artefact correction parameter values may be adaptively adjusted based on, e.g., the image information displayed to the user, the user's IPD and/or the user's gaze direction, a feedback provided by the user indicative of a level of annoyance of the perceived image artefact, frame rate, automatically determined, manually determined, or semi-automatically determined boundaries of the various viewing regions, etc.

In some embodiments, a masking function may be applied on selected pixels to arrive at an artefact correction function. In some embodiments, the masking function may be in the form of a low-pass spatial filter function.

Unless otherwise stated, merely to simplify the discussion that follows, examples are outlined herein with respect to the system configuration shown in FIGS. 2A and 2B.

Figures 4A, 4B:
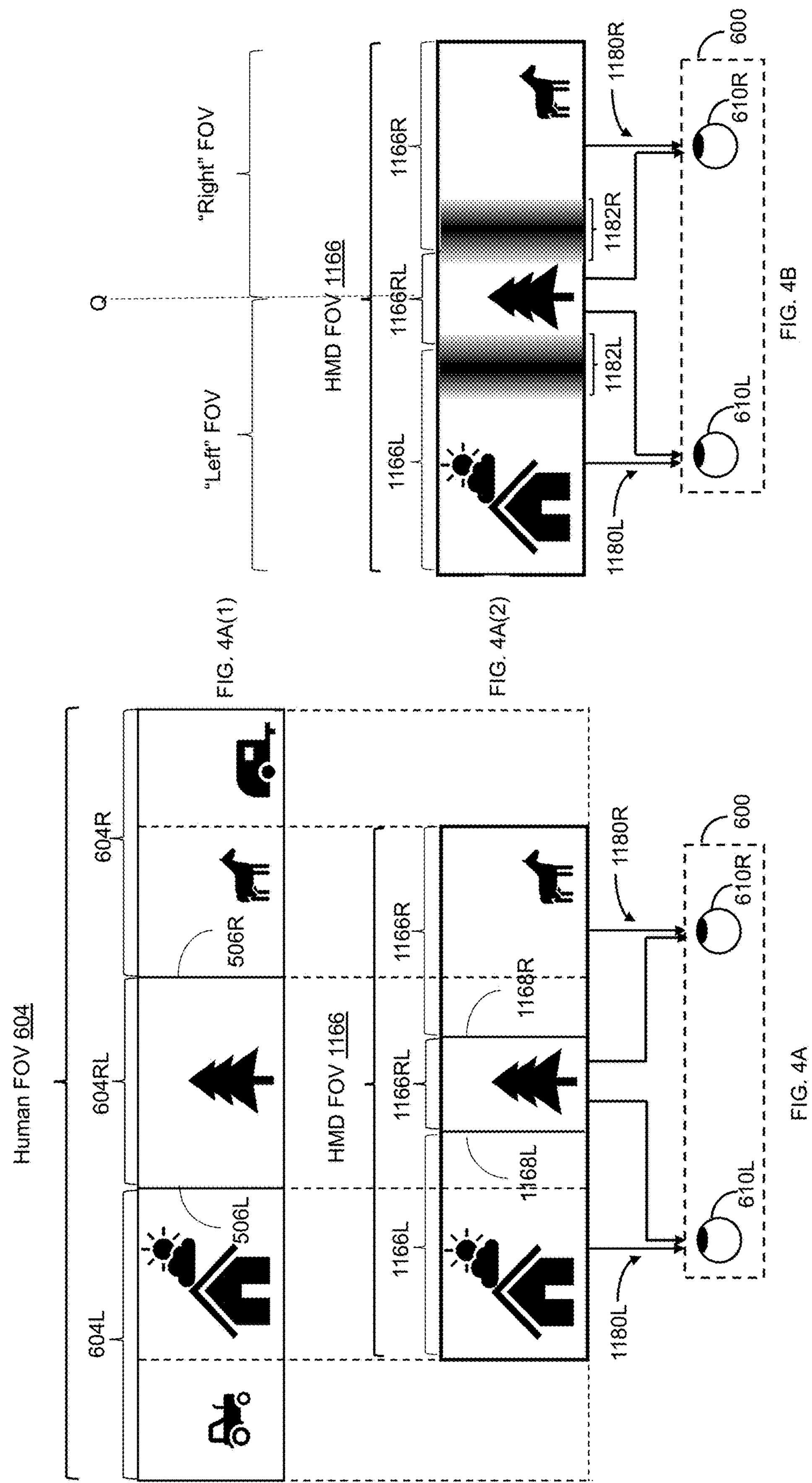
FIG. 4A is a diagram schematically illustrating the reduction in field of view (FOV) seen by a user when employing the binocular display system, according to some embodiments.

Additional reference is made to FIG. 4A. The display systems exemplified herein may be operable to provide an FOV that is smaller than the human FOV and, additionally, provide a smaller binocular overlap. As already discussed herein, a reduction in the binocular overlap may introduce subjective visual artefacts perceivable by the viewer. As schematically illustrated in the upper illustration FIG. 4A(1), under normal viewing conditions, the human forward-facing horizontal FOV arc (or simply: human FOV) 604 may range, for example, from 200 to 220 degrees, and the human binocular viewing region 604RL may be approximately 114 degrees.

In comparison thereto, certain binocular display systems may provide their users 600 with a reduced binocular FOV 1166 of, e.g., up to 70 degrees and a binocular viewing region (also: overlapping binocular FOV) 1166RL of, e.g., up to 40 degrees. The lower illustration of FIG. 4A(2) schematically exemplifies such reduction imposed by the binocular display system's FOV relative to the human FOV, which is shown schematically in the upper illustration FIG. 4A(1).

In the upper illustration FIG. 4A(1), the left and right binocular overlap borders are designated by reference numerals 506L and 506R, respectively; and in the lower illustration FIG. 4A(2), the left and right binocular overlap borders are designated by reference numerals 1168L and 1168R.

Additional reference is made to FIG. 4B. One of many subjective visual artefacts (also: undesired psychophysiological effects or subjective image artefacts or errors such a (perceived) anomalies during visual representation of digital graphics and/or imagery) that may be created due to the reduction of the FOV may relate to binocular rivalry and/or suppression, for example, because only single images are projected to the user's eyes where binocular images are normally expected. As a result, "luning" can occur, which refers to a subjective change in perceived brightness (e.g., darkening/reduced brightness or increased brightness) in the FOV. Luning may occur near the binocular overlap borders 1168L and 1168R of the binocular display FOV 1166, and gradually fade with increasing distance from the border. Such left and right "luning" regions appearing in the user's binocular display FOV are respectively designated in FIG. 4B by alphanumeric reference "1182L" and "1182R".

As already indicated herein, DUC engine 1500 may be operable to adapt one or more values relating to pixel and/or image display parameters to reduce a perception of a subjective visual artefacts in the perceived left and right-hand observation images 1180L and 1180R such as, for example, luning.

Figures 5A, 5B, 5C:
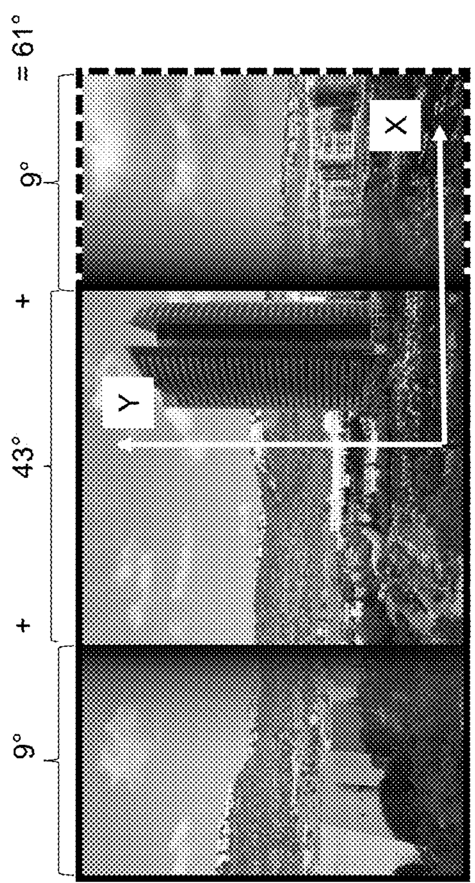
FIG. 5A shows left-eye image information that can be projected to a user; according to some embodiments.
FIG. 5B shows right-eye image information that can be projected to the same user, according to some embodiments.
FIG. 5C shows the combined left- and right-eye image information of FIGS. 5A and 5B and the resulting luning artefact as it may be perceived by the user, according to some embodiments.

FIG. 5A shows left-eye image information that is projected to a user, FIG. 5B shows right-eye image information that is projected to the same user, and FIG. 5C shows the combined left- and right-eye image information, and the resulting luning artefact as it may be perceived by the user.

Figure 6B:
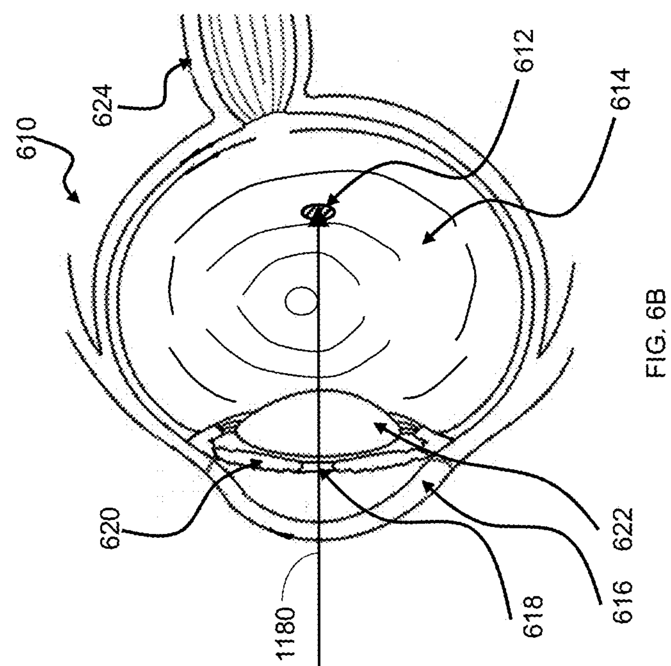
FIG. 6B is schematic illustration of image-bearing light incident onto the macula of a human eye.
Figure 6A:
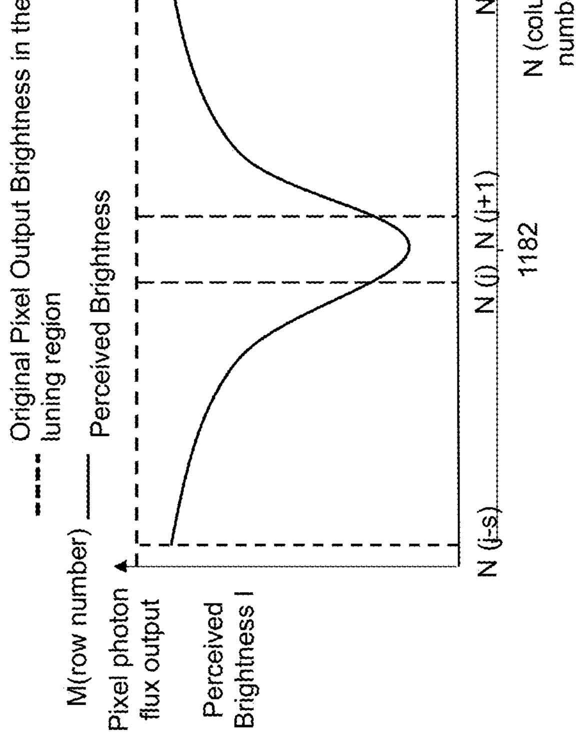
FIG. 6A shows a graph depicting the brightness of image-bearing light as perceived by a user experiencing luning, according to some embodiments.

FIG. 6A shows a graph showing the brightness of image-bearing light 1180 as perceived by user 600, the graph being descriptive of "luning" for one side, i.e., a left or right luning region. The perceived brightness I does not necessarily positively correlate with the actual intensity of image-bearing light 1180 incident onto retina 614.

Further reference is made to FIG. 6B, schematically showing image-bearing light 1180, for example, incident onto the macula 612 of the human eye's retina 614. The terms "image-bearing light and "observation images" may herein be used interchangeably. Macula 612 describes an area on retina 614 which is responsible for sharp central vision due to the comparatively high receptor density.

Image-bearing light 1180 exiting viewing optics 1162 propagates through the cornea 616 of eye 610, passes through pupil 618 defined by iris 620 and further propagate through the eye's lens 622 via the vitreous body (not shown) until incident onto macula 612. Image-bearing light 1180 incident onto photo-receptors (not shown) of macula 612 may cause the generation of signals which are transmitted to the patient's brain (not shown) via optic nerve 624.

In some embodiments, artefact correction parameter values applied may depend one or more values relating to characteristics of image-bearing light 1180 that is incident onto the user's retinal receptors, e.g., of the eye's macula 612. Such retinal input light characteristics may include, for example, retinal input light flux, perceived retinal input light brightness, input intensity, retinal input wavelength, retinal input phase, timing of light emission at retinal input, retinal input polarization, perceived retinal input brightness, retinal input contrast, retinal input location, and/or retinal wavelength sensitivity. Based on the retinal input light, characteristics of light that is emitted or output by display unit 1120 (also: display output light) may be adapted, for example, with respect to each pixel individually including, for example, a subpixel thereof which may relate to a certain pixel base color.

For example, pixel color and/or intensity output settings of an RGB pixel set may be adjusted individually (e.g., weighted differently) for each color of the set. For example, green light may be given more weight in terms of intensity increase than red and blue light components to overcome subjective visual artefacts.

In some embodiments, binocular display system calibration (including, e.g., DUC engine 1500 calibration) may be performed to associate identical calibration parameter values with a group of binocular display system users. In this case, artefact correction parameter values that are output by DUC engine 1500 may be adaptively determined in accordance with calibration parameter values that are identical for all users of the said group. For example, calibration of DUC engine 1500 for providing corrected image information may be performed based on reference values obtained for a group of test users or subjects. Optionally, calibration parameter values for a certain group of users and the corresponding artefact correction parameter values may be stored in a look-up-table (LUT).

In some embodiments, binocular display system calibration may be performed based on self-reference values (also: user-provided feedback values). Optionally, individual user-specific artefact correction parameter values, optionally generated in a DUC engine calibration procedure, may be stored in a look-up-table (LUT).

In some embodiments, calibration may be performed in a test environment and/or on-the-fly.

In some embodiments, artefact correction parameter values may be adjusted by the user on-the-fly, i.e., during operational use of the binocular display system, by providing a manual input command while controlling the vehicle with binocular display system 1000. In some embodiments, artefact correction parameter values may be adjusted in a preparatory setup.

In some embodiments, automatic and adaptive or dynamic modification of pixel and/or image display parameter values may be overridden through a manual input command provided, e.g., by the user of the display system, or vice versa.

In some embodiments, perceived pixel brightness may increase from the monocular viewing region towards the binocular viewing region, for example, in a linear or in a non-linear manner.

In the following example, the construction of an artefact correction function is discussed. The artefact correction function returns position-dependent manner artefact correction parameter value, adjusting pixel and/or image display parameter values such to reduce or eliminate image artefacts.

In some embodiments, the more pronounced the perceived image artefact, the greater may be modifications on source image information displayed to the user when modifying pixel and/or image display parameter values to reduce the image artefact.

In some embodiments, a pixel and/or image parameter value may be modified to an extent such to not exceed a Just Noticeable Difference (JND), for example, for the entire FOV of the observation images or one or more selected FOVs of the observation images perceived by the user. This way, it is ensured the image perceived by the user is as similar as possible to the image information output by display unit 1120. The JND may thus serve as an upper threshold limit for modifying (decreasing or increasing), for a given pixel position, output intensity, color and/or any the value of another pixel parameter. Analogously, the JND may serve as an upper limit for modifying image display parameter values such as, for example, a refresh rate.

Optionally, an optimization procedure may be applied to minimize or eliminate the perceived luning artefact while making minimum changes to the source images that are projected to the user. Differences in output intensity between adjacent pixels may not be considered when modifying values of pixel parameters to reduce or eliminate luning. In some embodiments, the JND may be exceeded.

In some embodiments, artefact correction may be applied only if the perceived artefact-related (e.g., luning-related) brightness magnitude difference between a luning and non-luning region meets a correction criterion. The correction criterion may manifest itself, for example, in a feedback indicative of a level of annoyance of the perceived artefact. In some embodiments, automated artefact correction may be selectively turned on and off, for example, by a user of the display system or by the display unit control engine.

In some embodiments, the application of artefact correction may depend on the image information (e.g., spatial frequency), e.g., in the luning region. The extent of applied pixel and/or image parameter value modification may be larger for low-frequency image information compared to the modification applied for high-frequency image information. For instance, modifications in output intensity may be larger for low-frequency spatial information than for comparatively high-frequency spatial information.

Optionally, no pixel and/or no image parameter value modification may be applied if the spatial frequency, in the luning region, exceeds a high spatial frequency threshold (relating to a correction criterion).

It should be noted that additional or alternative artefact correction functions may be employed for reducing luning. For example, different artefact correction functions and/or parameter values may be applied for the binocular and for the monocular viewing region.

Optionally, characteristics of light emitted by pixels that relate to a region of subjective artefact 1182 may be adjusted by DUC engine 1500. Optionally, modification of pixel values that map to subjective artefact region 1182 may be adapted differently than pixels that are mapped outside of subjective artefact region 1182 yet which nevertheless relate to the subjective artefact region 1182 such that suitable modification thereof may reduce or eliminate the perceived artefact.

In the discussion that follows, without be construed in a limiting manner, a subsequent column in x-direction of a pixel emitting right-eye light is indicated by an increase of an index of NR(i) to NR(i+1), and a subsequent row in y-direction is indicated by an increase of an index of MR(j) to MR(j+1).

Moreover, a subsequent column in x-direction of a pixel emitting left-eye light is indicated by an increase of an index of NL(p) to NL(p+1), and a subsequent row in y-direction is indicated by an increase of an index of ML(q) to ML(q+1).

In some embodiments, the position within the user's FOV 1166 and size of the region in which the subjective artefact 1182 occurs may be determined and associated with the corresponding pixels of display unit 1120.

Optionally, the artefact correction criterion may be static or adjusted, e.g., dynamically or adaptively.

In the event the perceived artefact brightness magnitude difference exceeds an artefact correction criterion, the pixel parameter value may be applied at the corresponding pixel position(s). In some embodiments, a pixel parameter value may be modified in accordance with an artefact correction function, e.g., as described herein. In some embodiments, the artefact correction criterion may be adjusted, e.g., dynamically or adaptively. Accordingly, a pixel parameter value may be modified dynamically or adaptively.

In some embodiments, the artefact correction criterion can be defined by a perceived artefact (e.g., luning-related) brightness magnitude difference threshold (also: artefact threshold).

For example, in case a perceived artefact-related brightness magnitude difference exceeds the artefact threshold, modification of pixel and/or image parameter values may be invoked by DUC engine 1500, e.g., as described herein.

As already briefly mentioned herein, the artefact threshold may optionally be defined based on a "Just Noticeable Difference" of the perceived image artefact.

Optionally, the artefact threshold may be determined based on a relative drop in perceived brightness when shifting from a position of the projected scene which is associated with pixel N(j) that is considered to project image-bearing light which is associated with lowest perceived brightness, to a position of the projected scene that is associated with neighboring pixel N(j+1) of assumed comparatively higher perceived brightness.

Optionally, the artefact threshold may be determined based on an average or a median value in the perceived brightness in subjective artefact region 1182 relative to an average or median perceived brightness of a displayed scene region that is outside subjective artefact region 1182. Additional or alternative statistical parameter values may be used for determining the artefact threshold.

In some embodiments, the artefact threshold may be determined based on perceived brightness difference between a brightness value in subjective artefact region 1182 and a brightness value outside subjective artefact region 1182. Optionally, the artefact threshold may be determined based on the difference between the lowest perceived brightness in subjective artefact region 1182 and the highest perceived brightness outside subjective artefact region 1182.

In some embodiments, output intensity of at least some or all pixels that are associated with the binocular viewing regions may be reduced, while pixel output intensity of monocular viewing regions remains unaltered. In another example, the output intensity of at least some or all pixels that are associated with the monocular viewing regions may be increased, while the pixel output intensity of the binocular viewing region remains unaltered. In some embodiments, pixel output intensity of pixels associated with monocular viewing regions may be increased and, at the same time, output intensity of pixels associated with binocular viewing is decreased to reduce or eliminate image artefacts.

In some embodiments, different artefact correction parameter values may be applied for left- and right luning regions 1182L and 1182R.

In some embodiments, to reduce or eliminate such subjective darkening, pixel output intensity in the monocular viewing region may be increased at least to the same extent or to a greater extent as the perceived darkening of the displayed scene region.

In some embodiments, correction of subjective visual artefacts may be approached differently for varying the binocular display system's operating characteristics. For example, pixel and/or image parameter values may be modified depending on the scene information that is projected to the user; a required level of situational awareness (which may depend on operational criticality), the user's visual acuity, left & right eye convergence, whether image information is displayed at infinite conjugates or not, left-eye and/or right eye modulation transfer function, and/or the like. An increase in subjective visual artefact correction may be obtained by applying pixel and/or image parameter value correction at increased frequency (e.g., in time-domain and/or spatial domain). Time-frequency domain related increase may be obtained by modifying pixel and/or image parameter value at comparatively higher rates. Examples of changes in spatial-frequency domain may include, for instance, applying a same pixel and/or image display parameter modification value on a plurality of pixels in a low level situational awareness scenario, whereas in a high level situation awareness scenario, a pixel and/or image display parameter modification value may be determined and applied individually for each pixel related to (e.g., associated with or mapped to) the subjective visual artefact. Different pixel and/or image display parameter modification values may be determined for different pixels and/or display regions, respectively, and/or at different times.

In 3D virtual world display scenarios, values relating to pixel and/or image parameters may be modified depending on eye convergence, which can be defined as the amount of eye rotation required for light coming from an object to fall onto the fovea. Eye convergence depends on which 3D virtual world object the eyes are focusing on and, therefore, on the perceived pixel brightness conveying the 3D virtual world object information. Optionally, subjective visual artefact correction may increase the more information (e.g., objects) a scene region to be projected to user 600 contains. Optionally, subjective visual artefact correction may be increased for (e.g., simulated) combat situations compared to the pixel and/or image parameter value modification applied in, e.g., non-combat situations.

Optionally, subjective visual artefact correction may be adapted depending on a gaze direction. For example, subjective visual artefact correction may be lower when gazing towards the sky compared to pixel and/or image parameter value correction applied when gazing towards the earth. Additional system characteristic that may be taken into account by DUC engine 1500 when applying pixel and/or image parameter value modification for reducing or eliminating subjective visual artefacts can include, for example, type of vehicle controlled by user (e.g., combat aircraft, combat helicopter); type of display environment (e.g., virtual reality, augmented reality, mixed reality) sun light direction; weather conditions; vehicle orientation relative to world; G-force; terrain color; sky color; user weight; user gaze direction; and/or the like.

In some embodiments, correction of subjective visual artefacts may be applied adaptively within subjective artefact region 1182, e.g., depending on the shape and/or type of object that is located within such region. For example, in areas of object contours, correction of subjective visual artefacts may be increased compared to other areas of the object or compared to projected scene regions which (e.g., momentarily) display, for example, only the sky.

In some embodiments, subjective artefact correction may be applied adaptively, i.e., the pixel and/or image display parameter modification values may be modified, for example, based on characteristics of objects in the scene region comprising the subjective artefact region. Such object characteristics can include, for example, object type (e.g., static object, moving object); height; width; object threat level; object size; object contrast; object position within FOV; object velocity; object acceleration/deceleration; object classification (e.g., obstacle, non-obstacle, threat, non-treat, friendly, non-friendly); and/or the like. For example, subjective artefact correction applied may be increased for objects in the scene region that are classified as a "threat", compared to correction applied for objects which are classified as "non-threat".

In some embodiments, the pixel and/or image display parameter modification values may be adjusted according to the perceived artefact brightness magnitude difference. In some embodiments, a pixel and/or image display parameter modification value may be adjusted according to the extent the said parameter value differs from the artefact correction criterion. In some embodiments, the artefact correction criterion may be adjusted based on physiological characteristics of the user including, for example, anthropometric information (e.g., individual inter-pupil distance, gender-based inter-pupil distance, etc.), dominant eye, distribution of retinal receptors, whether the user wears visuals aids (e.g., glasses, contact lenses, etc.), gender, age and/or G-forces to which pilot or user is subjected; system characteristics including, for example, weight of the binocular display device, color gamut, image resolution, frame rate, (momentary or average) spatial frequency, etc.; and/or social characteristics including, for example, profession (e.g., pilot vs non-pilot); pilot seniority; displayed image information including, for example, spatial frequency; object information classification (e.g., background object, foreground object, symbology); type of symbology (e.g., conformal, non-conformal); environmental conditions represented by the displayed information (e.g., weather, daylight vision, night vision, rain, dust, fog, snow, etc.); flight situation (e.g., combat situations, non-combat situations, aircraft orientation, aircraft speed, aircraft altitude); aircraft category including, for example, fixed-wing aircraft; rotary wing aircraft; tiltrotor aircrafts; and/or the like; and/or civilian or military aircraft including, for example, fighter jets, attack helicopters, military transport aircrafts, etc.

Considering a matrix having a m×n pixels, the pixels whose pixel outputs shall be altered to reduce, minimize or eliminate perceived image artefacts may be selected according to variety of spatial pixel selection profiles. The spatial pixel selection profiles according to characteristics of the perceived image artefacts. For example, if luning is perceived in a "straight" manner, i.e., the luning artefact boundaries are straight and extend from top to bottom of the area of display as perceived by the user, a pixel subset may be selected which delineates a "straight" or linear spatial profile and which also relates to the perceived luning artefact area. For example, pixel parameter value modification of the same magnitude may be applied for a subset of columns of pixels that provide the same perceived brightness within the straight luning region.

For example, if luning is perceived in a "curved" manner, i.e., the luning artefact boundaries are curved, a pixel subset may be selected which delineates a corresponding "curved" spatial profile and which also relates to the perceived curved luning artefact area. For example, the same pixel modification may be applied for a subset of columns of pixels that provide the same perceived brightness within the curved luning region.

Figures 7A, 7B:
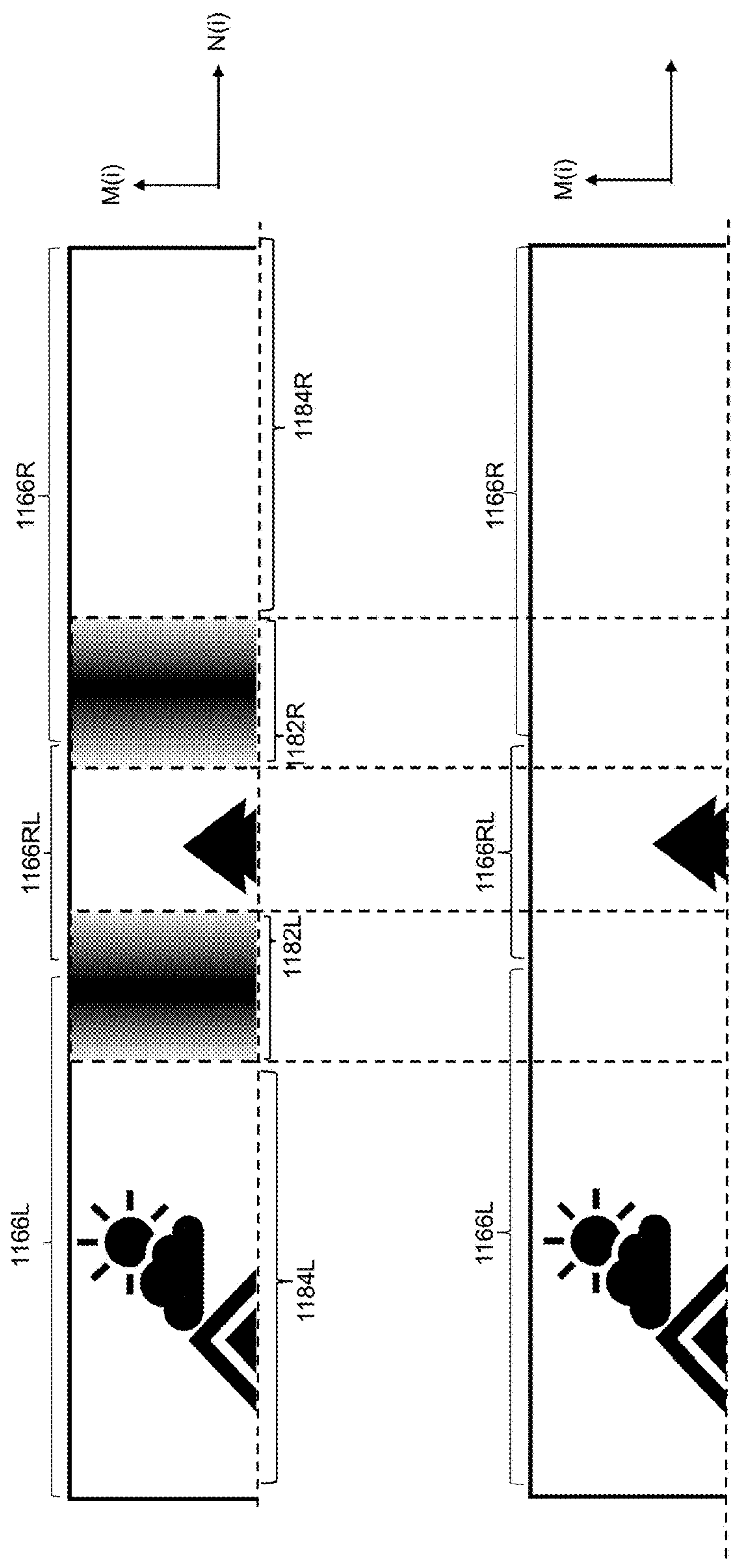
FIG. 7A schematically illustrates subjective "luning" artefact as perceived by a user, according to some embodiments.
FIG. 7B schematically shows the perceived image information after modifying a pixel and/or image display parameter value to reduce the luning artefact; according to some embodiments.

Additional reference is made to FIGS. 7A-B. FIG. 7A schematically illustrates the subjective "luning" artefact as perceived by user 600. There may be no positive correlation between the perceived brightness I and the intensity of image-bearing light 1180 that is incident onto retina 614.

FIG. 7B schematically shows the perceived image information after modifying a pixel parameter value (e.g., after applying a change in pixel output intensity) and/or image parameter value, for reducing or eliminating the perceived subjective artefact which, in the example shown in FIG. 7A, manifests itself in subjective darkening (e.g., luning).

In the example scenario shown in the FIGS. 7A and 7B, pixel output intensity is adjusted by DUC engine 1500 such to overcome entirely any subjectively perceived darkening of scene information in FOV 1166 perceived by user 600. Accordingly, as a result of modifying pixel output intensity (e.g., in the monocular viewing region(s)), left and right luning regions 1182L and 1182R are shown as eliminated. Optionally, luning artefacts 1182 may be reduced or eliminated, for example, without causing noticeable changes or such that the changes are as marginal as possible in perceived image brightness outside left and right luning subjective artefact regions 1182L and 1182R compared to the perceived image brightness before altering a pixel and/or image parameter value to reduce or eliminate for the luning artefact.

As described herein, a pixel and/or image parameter value may or may not be altered depending on the class of object being displayed. For example, no or comparatively less luning correction may be applied to pixels displaying symbology information, e.g., to avoid loss in displayed symbology contrast.

In some embodiments, binocular display system 1000 may be operable to display data descriptive of image information containing objects in association with different virtual image information layers. In some embodiments, modification of pixel and/or image parameter values to reduce or eliminate subjective visual artefacts may depend on the image information layer an object is associated with.

Object classification may be employed to associate the objects to a corresponding image information layer in correspondence with the object classification. Image processing techniques may be employed to identify and classify the objects. For example, image processing techniques may be employed to identify and classify objects as "background object" or "foreground object". In a further example, image data is descriptive of pre-classified objects or of objects that is pre-associated with image information layers. Optionally, background and foreground objects may be associated with a "full video information layer", and symbology objects with a "symbology information layer". Optionally, artefact correction may be applied to a greater extent to image information or an object that is associated with by the full video image layer and to a lesser extent or not at all to an object that is associated with the symbology information layer.

In some embodiments, luning correction may depend on whether symbology is displayed in overlay with background image information or with foreground image information. In some embodiments, artefact (e.g., luning) correction may depend on the size of the displayed object. For example, parameter values of pixels displaying grid symbology overlying terrain information, or power lines, may be altered more extensively than pixel and/or image parameter values relating to the display of, for example, a scalar (e.g., flight velocity).

In some embodiments, if a high-contrast object is displayed in a FOV region which is near or in the center of the overlap region, the object may be displayed monocularly, i.e., by pixels which are associated with one display only (either left or right display). In the latter case, no pixel adjustments to correct for luning artefacts may have to be applied as the object is displayed far from the overlap border region. However, if a high-contrast object is displayed near or within the overlap border region, luning correction may have to be applied.

In some embodiments, changing pixel and/or image parameter values to reduce or eliminate luning may depend on object contrast. For example, if object contrast meets a "high contrast criterion", which may pertain for example pertain to a high contrast threshold, the same object may be treated differently than objects that do not meet the high contrast criterion. If the contrast of an object is comparatively significant (i.e., the object meets the high contrast criterion), it may for example be processed in similar ways as symbology to reduce or eliminate luning. An object meeting the high contrast criterion may herein be referred to as a "high contrast object". Such high contrast objects may be identified and separated from the background information by applying, for example, "Chamfer matching", and/or other image processing techniques. Optionally, an object that is first associated with a full video layer may, as a result of being identified as a "high contrast object", associated with a symbology layer.

Figures 8A, 8B:
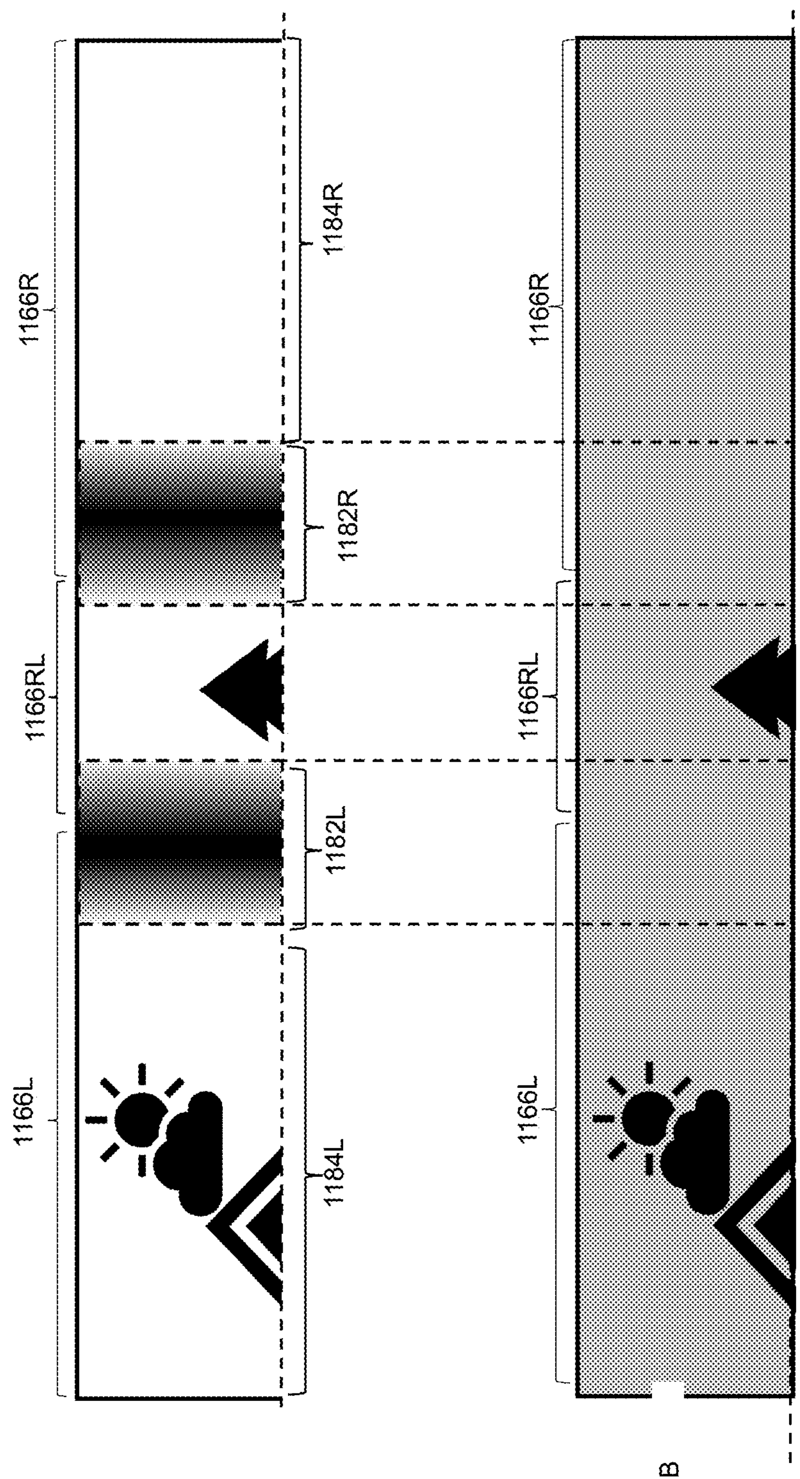
FIG. 8A schematically illustrates subjective "luning" artefact as perceived by a user, according to some embodiments.
FIG. 8B schematically shows the perceived image information after modifying a pixel and/or image display parameter value to reduce the luning artefact; according to some alternative embodiments.

Further referring to FIGS. 8A and 8B, left and right luning artefacts 1182L and 1182R are shown as being reduced or eliminated by modifying pixel and/or image parameter values of pixels resulting in a perceived brightness reduction in both the monocular and binocular viewing region compared to a perceived image brightness before altering pixel and/or image parameter values. In other words, the overall perceived brightness may be reduced as a result of altering pixel parameter values to reduce or eliminate luning artefacts.

Figures 9A, 9B:
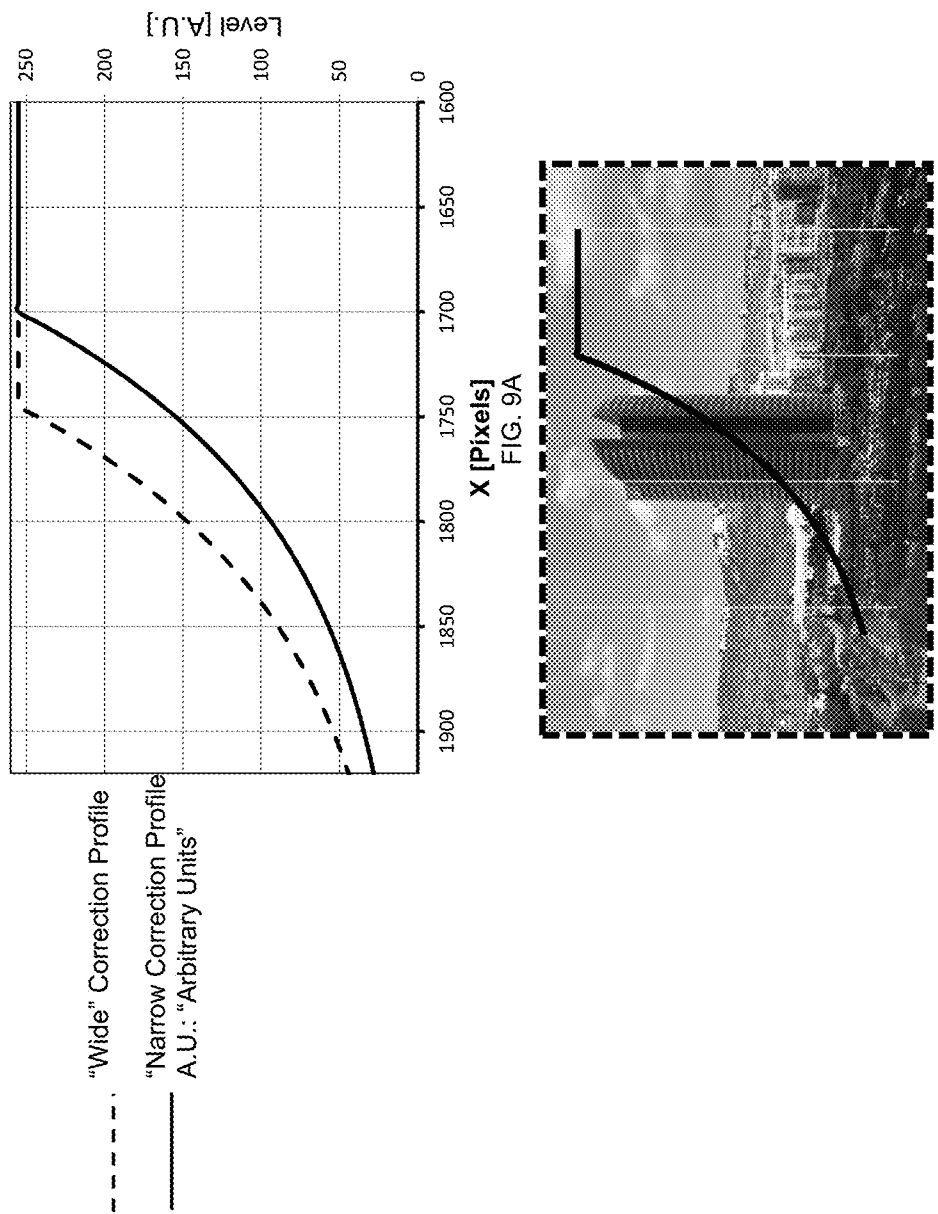
FIG. 9A depicts two graphs of artefact correction functions, according to some embodiments.
FIG. 9B depicts an artefact correction function having a "narrow" correction profile and which is overlaid over image information, according to some embodiments.

Referring now to FIG. 9A, an artefact correction function may be constructed, for example, as follows:

$$B(x)=M(x)\cdot B_o(x) \qquad \text{Equation 1:}$$

where B(x) is the pixel intensity output after modification of an initial pixel parameter value, M(x) is the masking correction function and $B_o(x)$ is the original pixel parameter value. The mathematical expression $B(x)=M(x)\cdot B_o(x)$ may be defined as an "artefact correction function".

The artefact correction function may be expressed, for example, by the following mathematical term:

$$M(x) = \begin{cases} 1, & x \le X_s \\ e^{-I(x-X_s)} & x > X_s \end{cases} \qquad \text{Equation 2}$$

In one example, Xs is a selected column number pixel position near or in the luning region, and I represents the decay parameter. In the example shown schematically in FIG. 7A with respect to a display having a display size of 1920×1200 pixels, I=0.01 [pixel$^{-1}$]; $X_s$=1745 [pixel] ("Wide" Correction Profile illustrated by dashed curve); or $X_s$=1700[pixel] ("Narrow" Correction Profile illustrated by continuous curve). Optionally, I may range, for example, from 0.008[pixel$^{-1}$] to 0.01 [pixel$^{-1}$]. It is noted that Xs may be set to pixel indices which are different from the pixel indices exemplified herein. In some embodiments, artefact correction functions may be different from what is described herein. In some examples "x" can designate a horizontal position along the display with x=0 indicating the pixel position of the display's vertical symmetry axis of a Cartesian coordinate system (see for example FIG. 5C). In other examples, "x" can designate the distance from the geometric center of the display according to a radial coordinate system.

In the example equations described herein, pixel parameter values are altered (also: adjusted) to correct for luning artefacts. However, pixel parameter values may also be altered to correct for other image artefacts.

It is noted that the expression "pixel intensity output" as used herein can pertain to any one of the pixel colors employed for synthetically generating a computerized color image for display to a user. Optionally, pixel parameter value correction may be controlled for each pixel individually. Optionally, pixel parameter value modification may be controlled for each one of a plurality of subsets of pixels. A pixel subset may pertain to a group of pixels providing different base colors of an additive color model, for example.

In some embodiments, no artefact correction function may be applied, even if the subject or user communicates the perception of luning image artefact.

Further referring to FIG. 9B, the scene information conveyed to the left-eye is shown prior to applying the artefact correction function which is shown in schematic overlay over the scene information.

Figure 10:
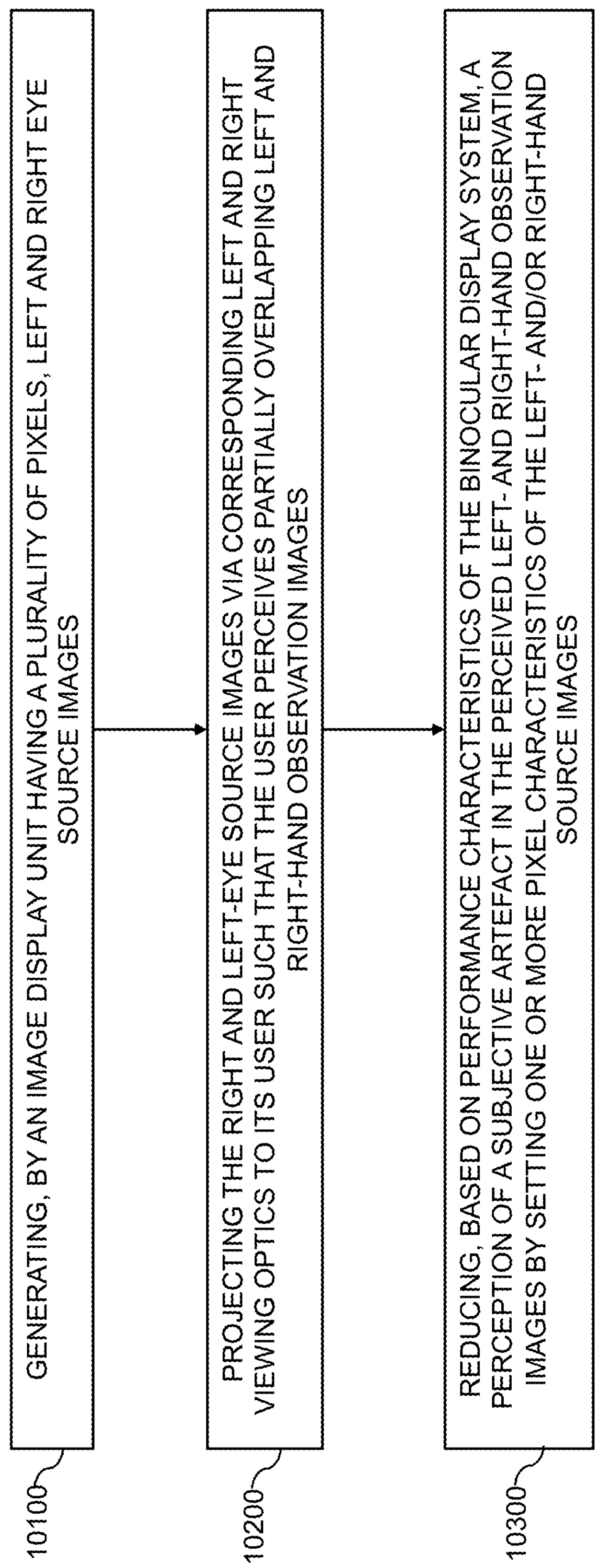
FIG. 10 is a block diagram of method for reducing perception of a subjective artefact, according to some embodiments.

Referring now to FIG. 10, a method for reducing subjective visual artefacts in head mounted display systems can include, for example, generating, by an image display unit having a plurality of pixels, left and right sources images (block 10100). The method may further include, for example, projecting the right and left-eye source images via corresponding left and right viewing optics to the user, such that the user perceives partially overlapping left and right-hand observation images (block 10200). The method may additionally include reducing, based on performance characteristics of the binocular display system, a perception of a subjective artefact in the perceived left- and right-hand observation images by modifying one or more values relating pixel parameters of the left- and right-hand source images (block 10300).

Additional Examples

Example 1 includes a method for reducing a subjective visual artefact when displaying binocular overlapping images to a user of a binocular display system, the method comprising: generating, by an image display unit comprising a plurality of pixels elements, right and left-eye source images; projecting the right and left-eye source images via corresponding left and right viewing optics to its user such that the user perceives partially overlapping left and right-hand observation images; reducing a perception of a subjective visual artefact in the perceived right and/or left-hand observation images by modifying one or more pixel parameter values of one or more pixels and/or by modifying one or more image parameters values of one or more display regions relating to the left and/or right-hand source images Example 2 includes the subject matter of Example 1 and, optionally, wherein reducing the perception of a subjective visual artefact is based on performance characteristics of the binocular display system.

Example 3 includes the subject matter of Example 2, optionally, wherein the performance characteristics of the binocular display system relate to performance characteristics of the image display unit and/or the viewing optics and/or the user's human vision system.

Example 4 includes the subject matter of Example 2 or 3 and, optionally, wherein the performance characteristics comprise boundary and location of the subjective visual artefact.

Example 5 includes the subject matter of Example 4 and, optionally, comprising determining border area locations between overlapping and non-overlapping regions of the left and right-hand observed images to derive the perceptual artefact locations and boundaries.

Example 6 includes the subject matter of any one or more of the Examples 1 to 5 and, optionally, modifying one or more pixel and/or image display parameter values relating to regions of occurrence of subjective visual artefacts.

Example 7 includes the subject matter of Example 6 and, optionally, wherein the subjective visual artefact comprises luning.

Example 8 includes the subject matter of any one or more of the Examples 1 to 7 and, optionally, wherein the modifying of one or more pixel and/or image parameter values of the left and/or right-hand source images is performed for pixels and/or image parameter values that are associated with a monocular viewing region, with a binocular viewing region, or both.

Example 9 includes the subject matter of Example 8 and, optionally, wherein the modifying of the one or more pixel and/or image parameter values comprises modifying the one or more pixel and/or image parameter values mapped to the binocular viewing region to reduce a subjective visual artefact perceived in the monocular viewing region.

Example 10 includes the subject matter of Example 8 or 9 and, optionally, wherein the modifying of the one or more pixel and/or image parameter values comprises modifying the one or more pixel and/or image parameter values mapped to the monocular viewing region to reduce a subjective visual artefact perceived in the monocular viewing region.

Example 11 includes the subject matter of any one or more of the Examples 8 to 10 and, optionally, wherein the modifying of the one or more pixel and/or image parameter values comprises modifying the one or more pixel and/or image parameter values mapped to the binocular viewing region to reduce a subjective visual artefact perceived in the binocular viewing region.

Example 12 includes the subject matter of any one or more of the Examples 8 to 11 and, optionally, wherein the modifying of the one or more pixel and/or image parameter values comprises modifying the one or more pixel and/or image parameter values mapped to the monocular viewing region to reduce a subjective visual artefact perceived in the binocular viewing region.

Example 13 includes the subject matter of any one or more of the Examples 1 to 12 and, optionally, wherein the modifying of one or more pixel parameter values is performed for one or more pixels that are mapped to a FOV region is outside a subjective artefact region and which one or more pixels relate to the subjective artefact region in that suitable modification of the one or more pixel parameter values reduces or eliminates the perceived artefact.

Example 14 includes the subject matter of any one or more of the Examples 1 to 13 and, optionally, wherein the modifying of one or more image display parameter values is performed for one or more image display regions that are mapped to a FOV region that is outside a subjective artefact region and which one or more image display regions relate to the subjective artefact region in that suitable modification of image display parameter values associated with the one or more image display regions reduces or eliminates the perceived artefact.

Example 15 includes the subject matter of any one or more of the Examples 1 to 14 and, optionally, wherein the modifying of a pixel and/or image parameter value is performed such to not exceed a Just Noticeable Difference (JND), for example, for the entire FOV of the observation images or one or more selected FOVs of the entire FOV of the observation images perceived by the user.

Example 16 includes the subject matter of any one or more of the Examples 1 to 14 and, optionally, wherein the modifying of a pixel and/or image parameter value results in exceeding a Just Noticeable Difference (JND), for example, over the entire FOV of the observation images or one or more selected FOVs of the observation images perceived by the user. Optionally, in a selected FOV region the JND may be exceeded and in another FOV region the JND may not be exceeded.

Example 17 includes the subject matter of any one or more of the Examples 1 to 16 and, optionally, wherein the reducing of the perception of a subjective visual artefact comprises: receiving values relating to the performance characteristics of the binocular display system; analyzing the received values relating to the performance characteristics of the binocular display system; controlling, based on the analyzing of the received performance characteristic values, one or more pixel and/or image display parameter values.

Example 18 includes the subject matter of any one or more of the Examples 1 to 16 and, optionally, wherein the modifying of one or more pixel and/or image parameter values of the left and/or right-hand source images is performed in response to receiving a manual input command.

Example 19 includes the subject matter of any one or more of the Examples 1 to 18 and, optionally, wherein the one or more pixel parameter values comprise: a pixel output intensity value, a pixel refresh rate and/or a pixel color.

Example 20 includes the subject matter of any one or more of the Examples 1 to 19 and, optionally, wherein the one or more image display parameter values comprise: an image display refresh rate and/or refresh rates for one or more display regions of the image display unit.

Example 21 includes the subject matter of any one or more of the Examples 1 to 20 and, optionally, comprising associating image data descriptive of objects with different image information layers.

Example 22 includes the subject matter of Example 21 and, optionally, wherein the modifying of one or more pixel and/or image parameter values of an object is based on the association of the object with one of the plurality of image information layers.

Example 23 includes the subject matter of any one or more of the Examples 1 to 22 and, optionally, wherein the binocular display system includes a head-mountable display system.

Example 24 includes a binocular display system operable to display binocular overlapping images to a user of the binocular display system, the binocular display system comprising: an image display unit comprising a plurality of pixels that are operable to display right and left-eye source images; binocular viewing optics for projecting the right and left-eye source images to a user such that the user perceives partially overlapping left and right-hand observation images; a display unit control engine that is operable to reduce or eliminate a perception of a subjective visual artefact in the perceived right and/or left-hand observation images by setting one or more pixel and/or image parameter values relating to the left and/or right-hand source images.

Example 25 includes the subject matter of Example 24 and, optionally, wherein the display unit control engine reduces or eliminates a perception of a subjective visual artefact based on performance characteristics of the binocular display system.

Example 26 includes the subject matter of Example 25 and, optionally, wherein the performance characteristics of the binocular display system relate to performance characteristics of the image display unit and/or the binocular viewing optics and/or the user's human vision system.

Example 27 includes the subject matter of Example 25 or Example 26 and, optionally, wherein the performance characteristics pertain to the locations of one or more regions of occurrence of the subjective artefacts.

Example 28 includes the subject matter of any one or more of the Examples 24 to 27 and, optionally, wherein the display unit control engine is operable to determine the location of a border area location between overlapping and non-overlapping regions of the left and right-hand observed images.

Example 29 includes the subject matter of Example 28 and, optionally, wherein the display unit control engine is operable to derive, based on the determining of the location between overlapping and non-overlapping regions of the left and right-hand observed images, the location and boundary of a perceptual artefact.

Example 30 includes the subject matter of any one or more of the Examples 24 to 29 and, optionally, wherein the display unit control engine is operable to modify one or more pixel parameter values of one or more pixels and/or image parameter values of one or more display regions of the left and/or right-hand source images related to one or more regions of occurrences of a perceptual artefact.

Example 31 includes the subject matter of any one or more of the Examples 24 to 30 and, optionally, wherein the display unit control engine is operable to modify the one or more pixel and/or image parameter values of the left and/or right-hand source images automatically, based on performance characteristics of the binocular display system and/or based on a received manual input command.

Example 32 includes the subject matter of any one or more of the Examples 24 to 31 and, optionally, wherein the display unit control engine is operable to modify one or more pixel parameter values of one or more pixels, and/or image parameter values of one or more display regions which are mapped to a monocular and/or binocular viewing region.

Example 33 includes the subject matter of any one or more of the examples 24 to 32 and, optionally, wherein the display unit control engine is operable to reduce or eliminate subjective visual artefacts by reducing pixel output intensity of one or more pixels mapped outside the one or more subjective artefact regions.

Example 34 includes the subject matter of any one or more of the Examples 24 to 33 and, optionally, comprising a processor and a memory, wherein the processor is operable to execute program instructions stored in the memory resulting in implementing the display unit control engine.

Example 35 includes the subject matter of any one or more of the Examples 24 to 34 and, optionally, comprising circuitry for implementing the display unit control engine.

Example 36 includes a method for displaying images to a user of a binocular display system, the method comprising: receiving image data that is descriptive of right and left-eye source images; and modifying the image data and/or modifying an operating parameter value of a display unit which operable to display the image data to a user such that, if the right and left-eye source images are projected from the display unit via the binocular display system to the user a subjective visual artefact in the perceived right and/or left-hand observation images is reduced or eliminated.

Example 37 includes the subject matter of Example 36 and, optionally, comprising receiving data descriptive of the binocular display system performance characteristics, wherein the modifying of the image data and/or of the display unit operating parameter value is performed based on the received data that is descriptive of the binocular display system performance characteristics.

Example 38 includes a method for reducing a subjective visual artefact when displaying binocular overlapping images to a user of a binocular display system, the method comprising: receiving values relating to the performance characteristics of binocular display system; analyzing the received values relating to the performance characteristics of the binocular display system; and determining, based on the performed analysis, pixel and/or image display parameter modification values for reducing or eliminating a subjective artefact.

Example 39 includes the subject matter of Example 38 and, optionally, controlling, based on the determined pixel parameter modification values, one or more pixels of a display unit of the binocular display system.

Example 40 includes the subject matter of Examples 38 or 39 and, optionally, controlling, based on the determined image display parameter modification values, one or more display regions of a display unit of the binocular display system.

Example 41 includes circuitry comprising: a memory that is operable to store program code instructions; and a processor that is operable to execute program code instructions stored in the memory; wherein execution of program code instructions stored in the memory by the processor causes the circuitry to perform the methods of any one or more of the claims 1 to 23 and/or 36 to 40.

Any digital computer system, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

Additionally or alternatively, the methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The term "engine" may comprise one or more computer modules, wherein a module may be a self-contained hardware and/or software component that interfaces with a larger system. A module may comprise a machine or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, an Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

The term "random" also encompasses the meaning of the term "substantially randomly" or "pseudo-randomly".

The term "static" as used also encompasses the term "substantially static".

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise specified, the terms "substantially", "about" and/or "close" with respect to a magnitude or a numerical value may imply to be within an inclusive range of −10% to +10% of the respective magnitude or value.

"Coupled with" can mean indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not to be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

As used herein, the phrase "A, B, C, or any combination of the aforesaid" should be interpreted as meaning all of the following: (i) A or B or C or any combination of A, B, and C, (ii) at least one of A, B, and C; (iii) A, and/or B and/or C, and (iv) A, B and/or C. Where appropriate, the phrase A, B and/or C can be interpreted as meaning A, B or C. The phrase A, B or C should be interpreted as meaning "selected from the group consisting of A, B and C". This concept is illustrated for three elements (i.e., A, B, C), but extends to fewer and greater numbers of elements (e.g., A, B, C, D, etc.).

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "for example", "e.g.", "for instance" and "optionally" may herein be used interchangeably.

The number of elements shown in the Figures should by no means be construed as limiting and is for illustrative purposes only.

It is noted that the terms "operable to" can encompass the meaning of the term "adapted or configured to". In other words, a machine "operable to" perform a task can in some embodiments, embrace a mere capability (e.g., "adapted") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

What is claimed is:

1. A method for reducing a subjective binocular rivalry artefact when displaying binocular overlapping images to a user of a binocular display system, the method comprising:

generating, by an image display unit comprising a plurality of pixels elements relating to a plurality of different information layers, right and left eye source images;

projecting the right and left-eye source images via corresponding left and right viewing optics to its user such that the user perceives partially overlapping left and right-hand observation images;

reducing a perception of binocular rivalry artefact in a subjective artefact region in the perceived right and/or left-hand observation images by modifying one or more pixel parameter values of one or more pixels and/or by modifying one or more image parameters values of one or more display regions relating to the left and/or right-hand source images, wherein the modifying of one or more pixel parameter values is performed based on an association of a displayed object with at least two of the plurality of different image information layers, wherein at least one first information layer pertains to a scene and at least one second information layer pertains to symbology overlaying the scene, and wherein binocular rivalry artefact correction is performed to a greater extent for the least one first information layer pertaining to the scene than for the at least one second information layer pertaining to the symbology.

2. The method of claim 1, further comprising determining border area locations between overlapping and non-overlapping regions of the left and right-hand observed images to derive the perceptual artefact locations and boundaries.

3. The method of claim 1, wherein the modifying of the one or more pixel and/or image parameter values comprises modifying one or more pixel and/or image parameter values mapped to the binocular viewing region to reduce a binocular rivalry artefact perceived in a monocular viewing region.

4. The method of claim 1, wherein the modifying of the one or more pixel and/or image parameter values comprises modifying the one or more pixel and/or image parameter values mapped to a monocular viewing region to reduce a subjective binocular rivalry artefact perceived in the binocular viewing region.

5. The method of claim 1, wherein the modifying of one or more image display parameter values is performed for one or more image display regions that are mapped to a FOV region that is outside a subjective binocular rivalry artefact region and which one or more image display regions relate to the subjective artefact region in that suitable modification of image display parameter values associated with the one or more image display regions reduces or eliminates the perceived binocular rivalry artefact.

6. The method of claim 1, wherein the modifying of a pixel and/or image parameter value is performed such to not exceed a Just Noticeable Difference (JND) for an entire FOV of the observation images or one or more selected FOVs of the entire FOV of the observation images perceived by the user.

7. A binocular display system operable to display binocular overlapping images to a user of the binocular display system, the binocular display system comprising:

an image display unit comprising a plurality of pixels that are operable to display right and left-eye source images including an object that relates to a plurality of different information layers;

binocular viewing optics for projecting the right and left-eye source images to a user such that the user perceives partially overlapping left and right-hand observation images;

a display unit control engine that is operable to reduce or eliminate a perception of a subjective binocular rivalry artefact in a subject artefact region in the perceived right and/or left-hand observation images by setting one or more pixel and/or image parameter values relating to the left and/or right-hand source images, wherein the modifying of one or more pixel parameter values is performed based on an association of the object displayed by the image display unit with at least two of the plurality of different image information layers, wherein the at least two of the plurality of information layers pertain to a scene and to symbology virtually overlaying the scene, and wherein binocular rivalry artefact correction is performed to a greater extent for the background scene layer than for the symbology layer.

8. The binocular display system of claim 7, wherein the display unit control engine reduces or eliminates a perception of a subjective binocular rivalry artefact based on performance characteristics of the binocular display system.

9. The binocular display system of claim 8, wherein the performance characteristics pertain to the locations of one or more regions of occurrence of the subjective binocular rivalry artefacts.

10. The binocular display system of claim 7, wherein the display unit control engine is operable to determine the location of a border area location between overlapping and non-overlapping regions of the left and right-hand observed images.

11. The binocular display system of claim 10, wherein the display unit control engine is operable to derive, based on the determining of the location between overlapping and nonoverlapping regions of the left and right-hand observed images, the location and boundary of a perceptual binocular rivalry artefact.

12. The binocular display system of claim 7, wherein the display unit control engine is operable to modify one or more pixel parameter values of one or more pixels and/or image parameter values of one or more display regions of the left and/or right-hand source images related to one or more regions of occurrences of a perceptual binocular rivalry artefact.

13. The binocular display system of claim 7, wherein the display unit control engine is operable to modify one or more pixel parameter values of one or more pixels, and/or image parameter values of one or more display regions which are mapped to a monocular and/or binocular viewing region.

14. The binocular display system of claim 7, wherein the display unit control engine is operable to reduce or eliminate subjective binocular rivalry artefacts by reducing pixel output intensity of one or more pixels mapped outside the one or more subjective artefact regions.

15. The binocular display system of claim 7, comprising a processor and a memory, wherein the processor is operable to execute program instructions stored in the memory resulting in implementing the display unit control engine.

16. The binocular display system of claim 7, comprising circuitry for implementing the display unit control engine.

17. The system of claim 7, wherein the modifying of the one or more pixel and/or image parameter values comprises modifying the one or more pixel and/or image parameter values mapped to the binocular viewing region to reduce a subjective binocular rivalry artefact perceived in the monocular viewing region.

18. A binocular display system configured to display images to a user of, the system comprising a display unit; one or more processors; and one or more memories storing software code portions executable by the one or more processors to enable performing the following:

receiving image data that is descriptive of right and left-eye source images for displaying an object and relating to at least two of a plurality of different information layers; and modifying the image data and/or modifying an operating parameter value of the display unit, based on an association of the object to be displayed with at least one of the plurality of different image information layers such that, a subjective binocular rivalry artefact in a subjective artefact region in the perceived right and/or left-hand observation images is reduced or eliminated, wherein the at least two of the plurality of information layers pertain to symbology a scene and symbology, and wherein binocular rivalry artefact correction is performed to a greater extent for the scene layer than for the symbology layer.

19. The system according to claim 18, further comprising receiving data descriptive of the binocular display system performance characteristics, wherein the modifying of the image data and/or of the display unit operating parameter value is performed based on the received data that is descriptive of the binocular display system performance characteristics.

20. The method of claim 1, wherein pixel values are not adapted for the symbology layer.

21. The system of claim 7, wherein pixel values are not adapted for the symbology layer.

22. The system of claim 18, wherein pixel values are not adapted for the symbology layer.

* * * * *